US010359874B2

(12) United States Patent
Gallardo et al.

(10) Patent No.: US 10,359,874 B2
(45) Date of Patent: Jul. 23, 2019

(54) INTEGRATED ACTIVE MATRIX TOUCH PANEL

(71) Applicant: Sharp Kabushiki Kaisha, Osaka (JP)

(72) Inventors: Diego Gallardo, Oxford (GB); Christopher James Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/761,847

(22) PCT Filed: Sep. 29, 2016

(86) PCT No.: PCT/JP2016/004399
§ 371 (c)(1),
(2) Date: Mar. 21, 2018

(87) PCT Pub. No.: WO2017/056500
PCT Pub. Date: Apr. 6, 2017

(65) Prior Publication Data
US 2018/0232088 A1    Aug. 16, 2018

(30) Foreign Application Priority Data
Oct. 2, 2015   (GB) .................................. 1517446.9

(51) Int. Cl.
*G06F 3/041*    (2006.01)
*G06F 3/044*    (2006.01)
*G06F 3/047*    (2006.01)

(52) U.S. Cl.
CPC ............ *G06F 3/0412* (2013.01); *G06F 3/044* (2013.01); *G06F 3/047* (2013.01);
(Continued)

(58) Field of Classification Search
CPC ............................... G06F 3/0412; G06F 3/044
See application file for complete search history.

(56) References Cited

U.S. PATENT DOCUMENTS 4,293,734 A    10/1981 Pepper, Jr.
5,841,078 A    11/1998 Miller et al.
(Continued)

OTHER PUBLICATIONS

International Search Report for PCT/JP2016/004399, dated Nov. 15, 2016.

*Primary Examiner* — Dong Hue Liang
(74) *Attorney, Agent, or Firm* — Renner Otto Boisselle & Sklar, LLP

(57) ABSTRACT

An integrated touchscreen comprises display pixels arranged in a two-dimensional matrix of rows and columns to minimize the reduction in aperture ratio of the display pixels. A matrix of touch element is defined in the display pixels, with a touch unit cell encompassing a group of display pixels. A touch element is comprised of a matrix of touch unit cells. The common electrodes of the display pixels encompassed in the touch element are electrically connected together to form a common electrode for the touch element. The touch unit cell includes conductive lines extending in the row direction and conductive lines extending in the column direction. The touchscreen comprises a controller that can operate in either one of a self-capacitance touch sensing mode and a mutual-capacitance touch sensing mode.

20 Claims, 16 Drawing Sheets

(52) U.S. Cl.
CPC .. *G02F 2201/121* (2013.01); *G02F 2201/123* (2013.01); *G06F 2203/04112* (2013.01)

(56) References Cited

U.S. PATENT DOCUMENTS

| | | |
|---|---|---|
| 7,859,521 B2 | 12/2010 | Hotelling et al. |
| 8,054,300 B2 | 11/2011 | Bernstein |
| 8,390,582 B2 | 3/2013 | Hotelling et al. |
| 2010/0194707 A1* | 8/2010 | Hotelling .............. G06F 3/0412 345/173 |
| 2011/0050585 A1 | 3/2011 | Hotelling et al. |
| 2014/0078096 A1 | 3/2014 | Tan et al. |
| 2016/0283023 A1* | 9/2016 | Shin ........................ G06F 3/044 |

* cited by examiner

[Fig. 1] CONVENTIONAL ART
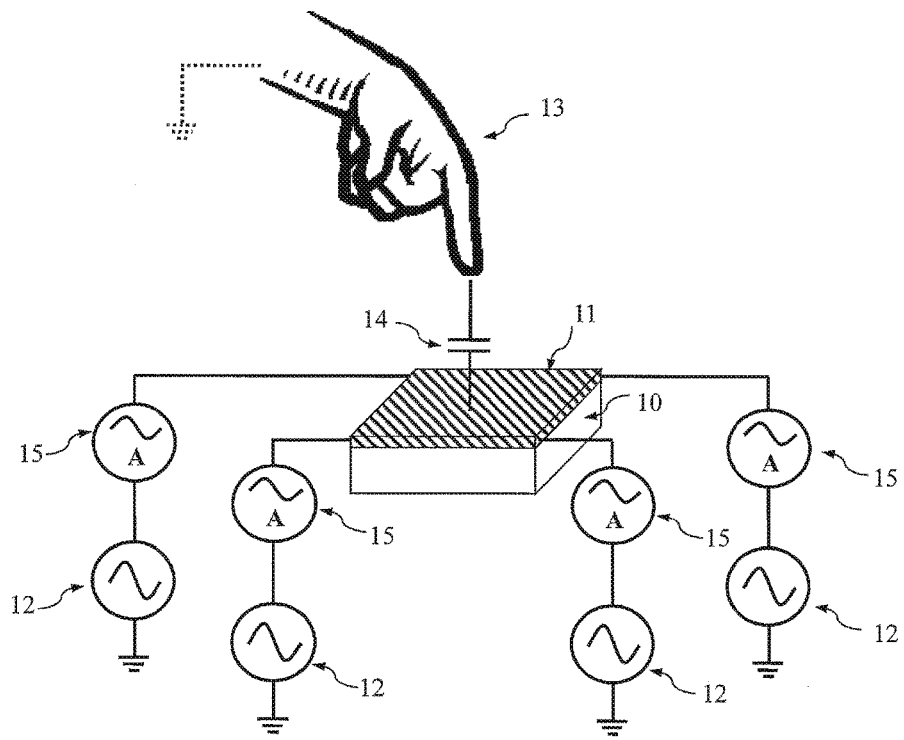
[Fig. 2] CONVENTIONAL ART
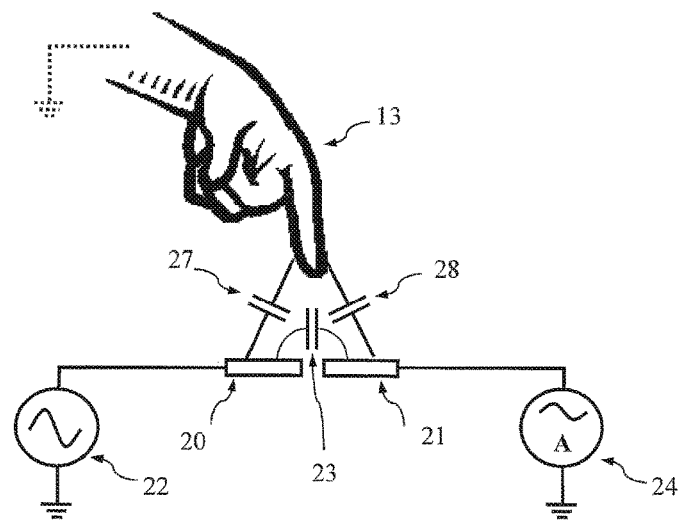

[Fig. 3A]
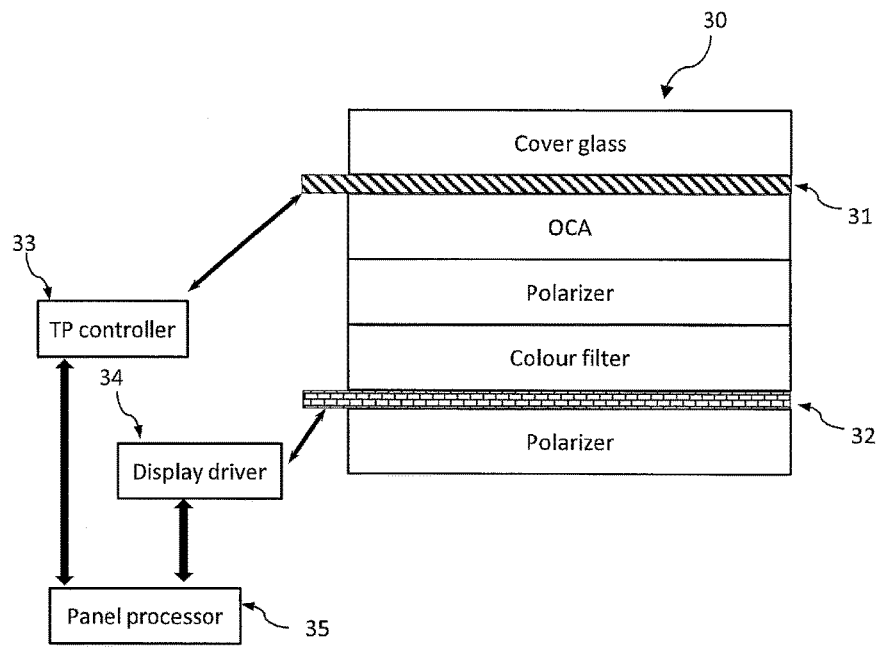
[Fig. 3B]
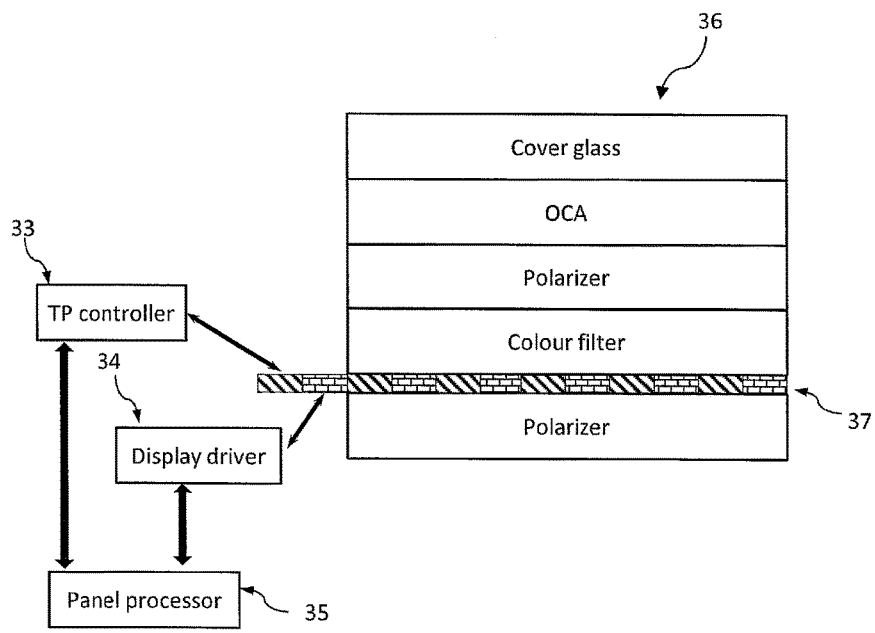

[Fig. 4]
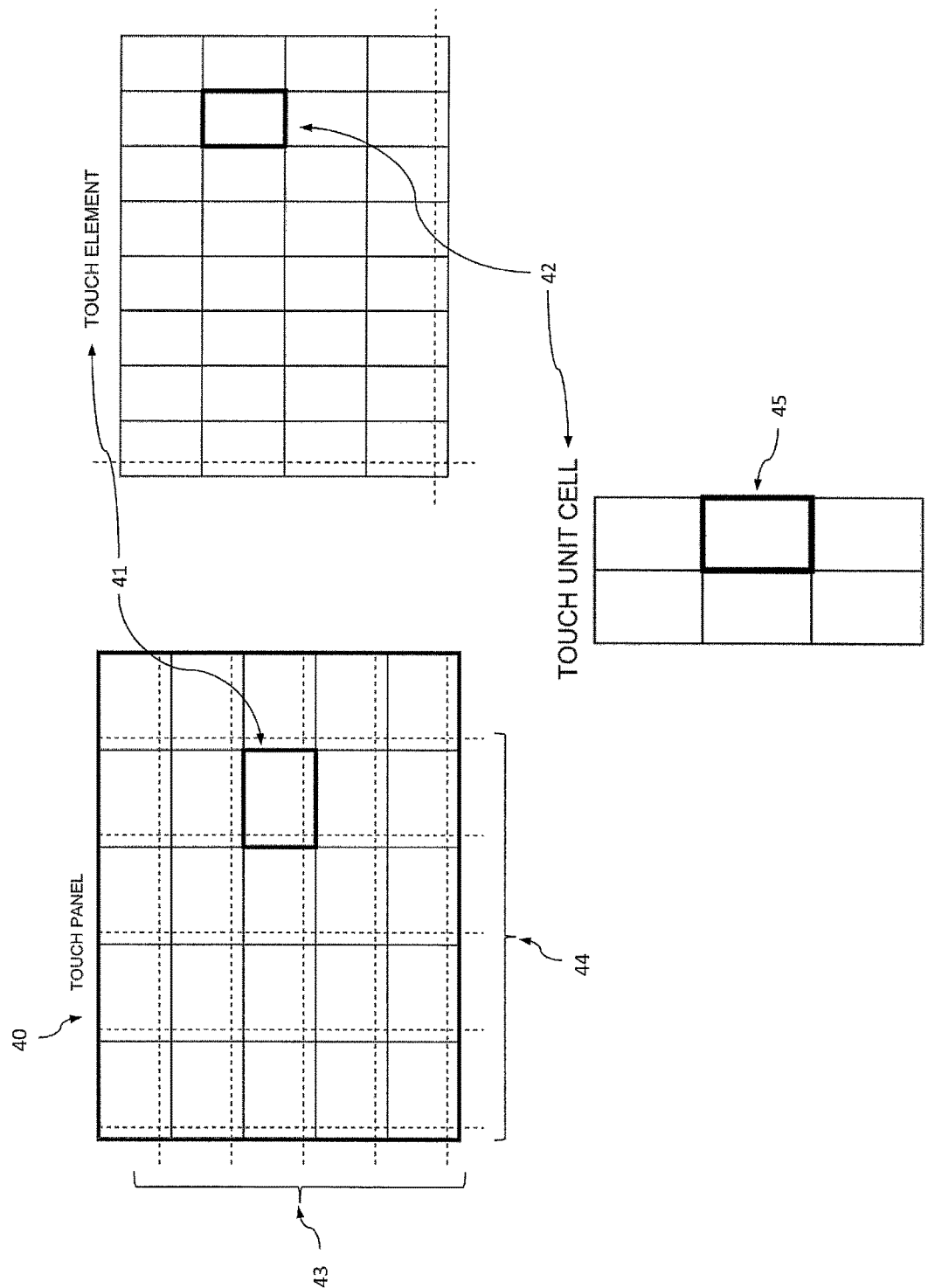

[Fig. 5A]
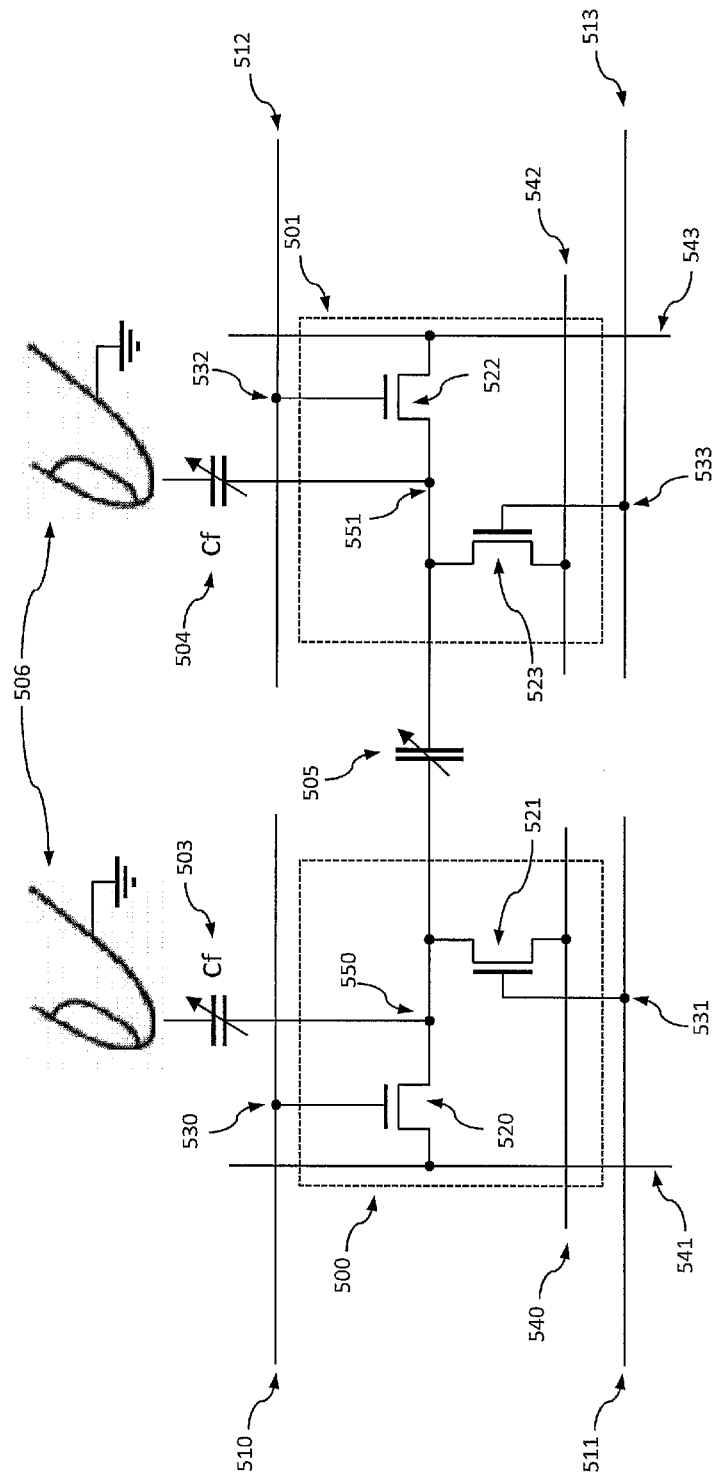

[Fig. 5B]
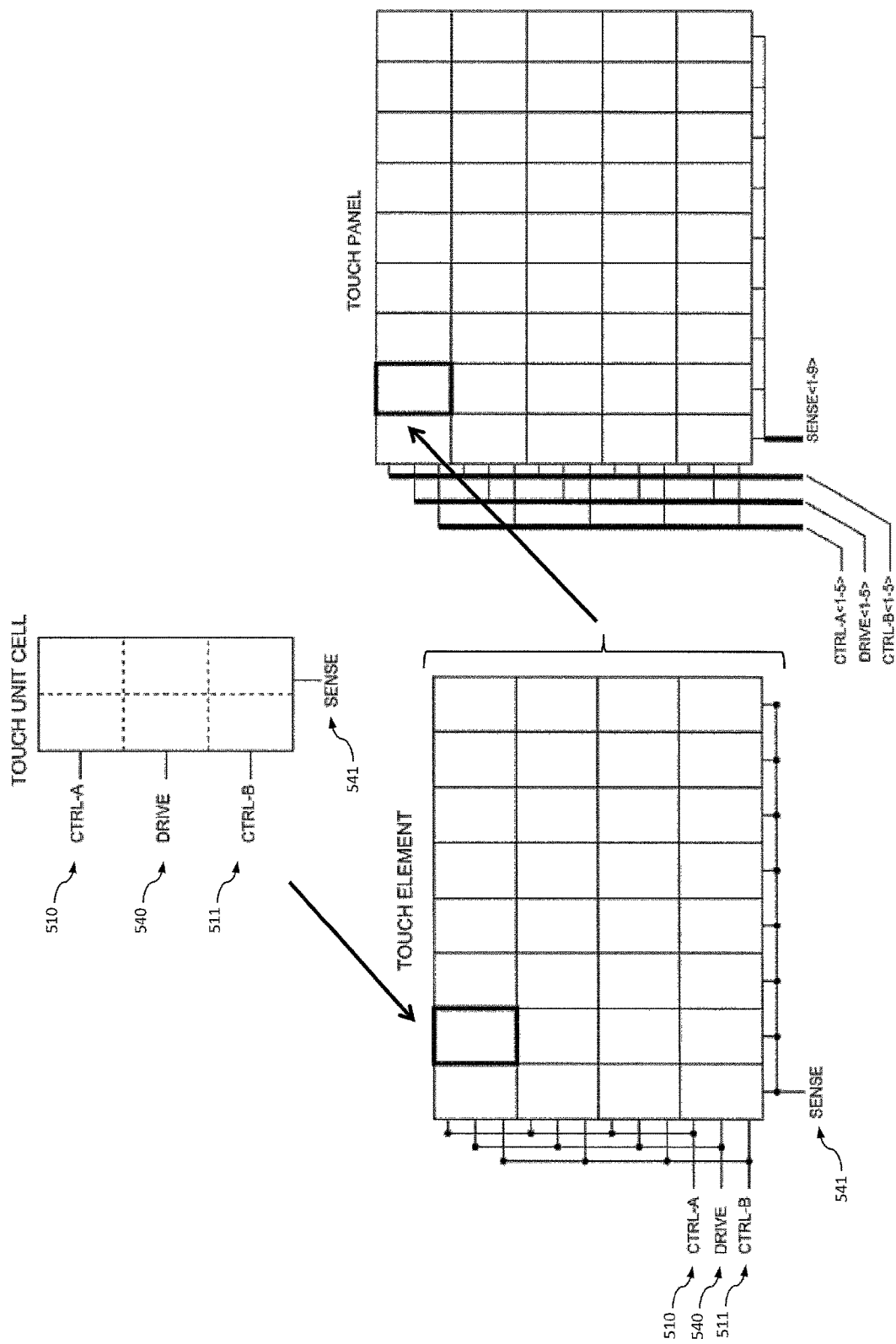

[Fig. 5C]
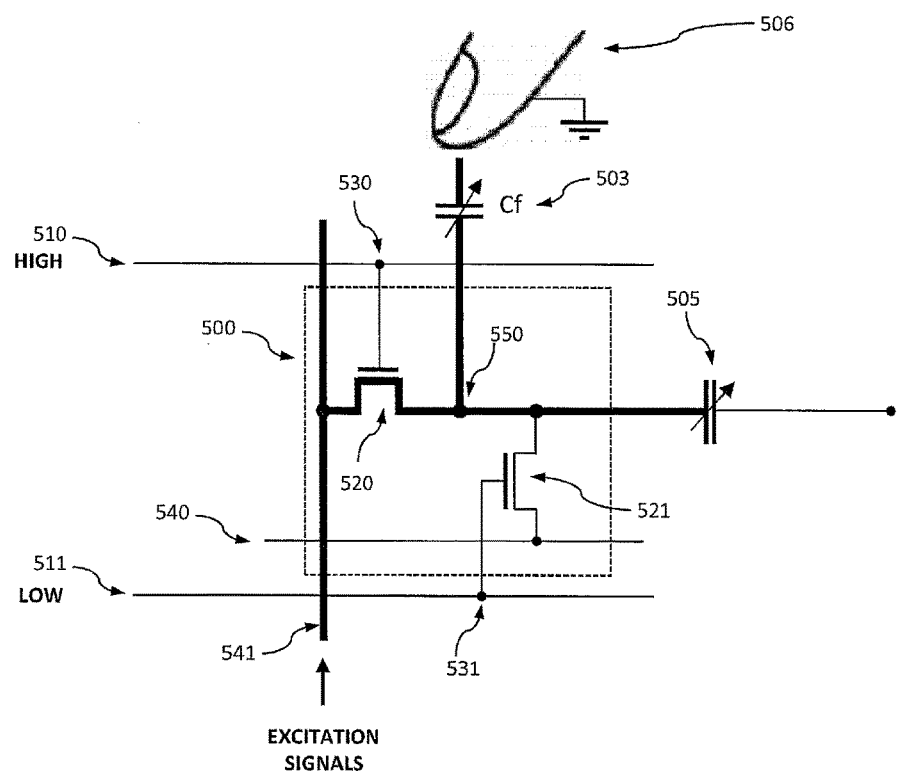

[Fig. 5D]
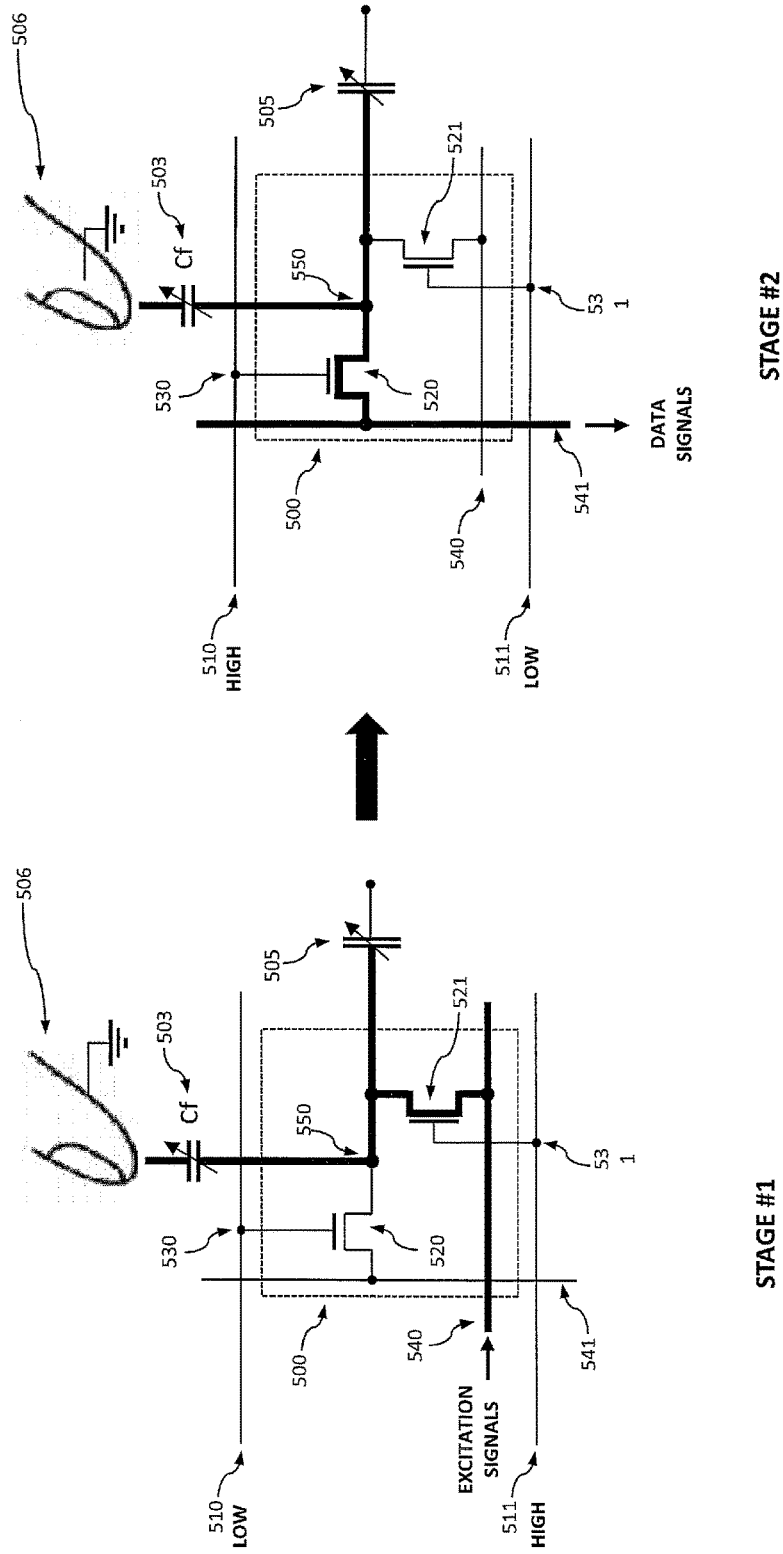

[Fig. 5E]
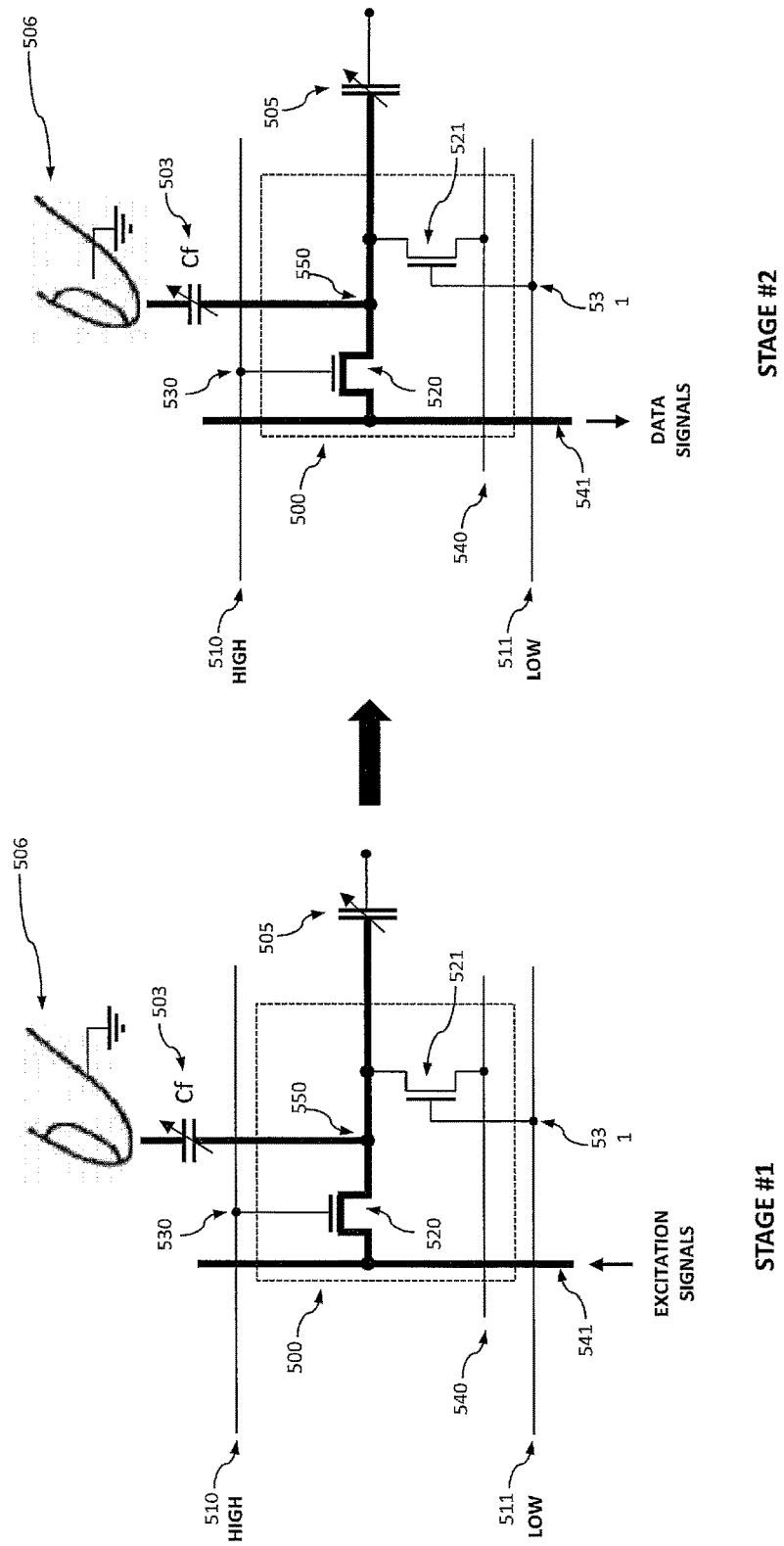

[Fig. 5F]
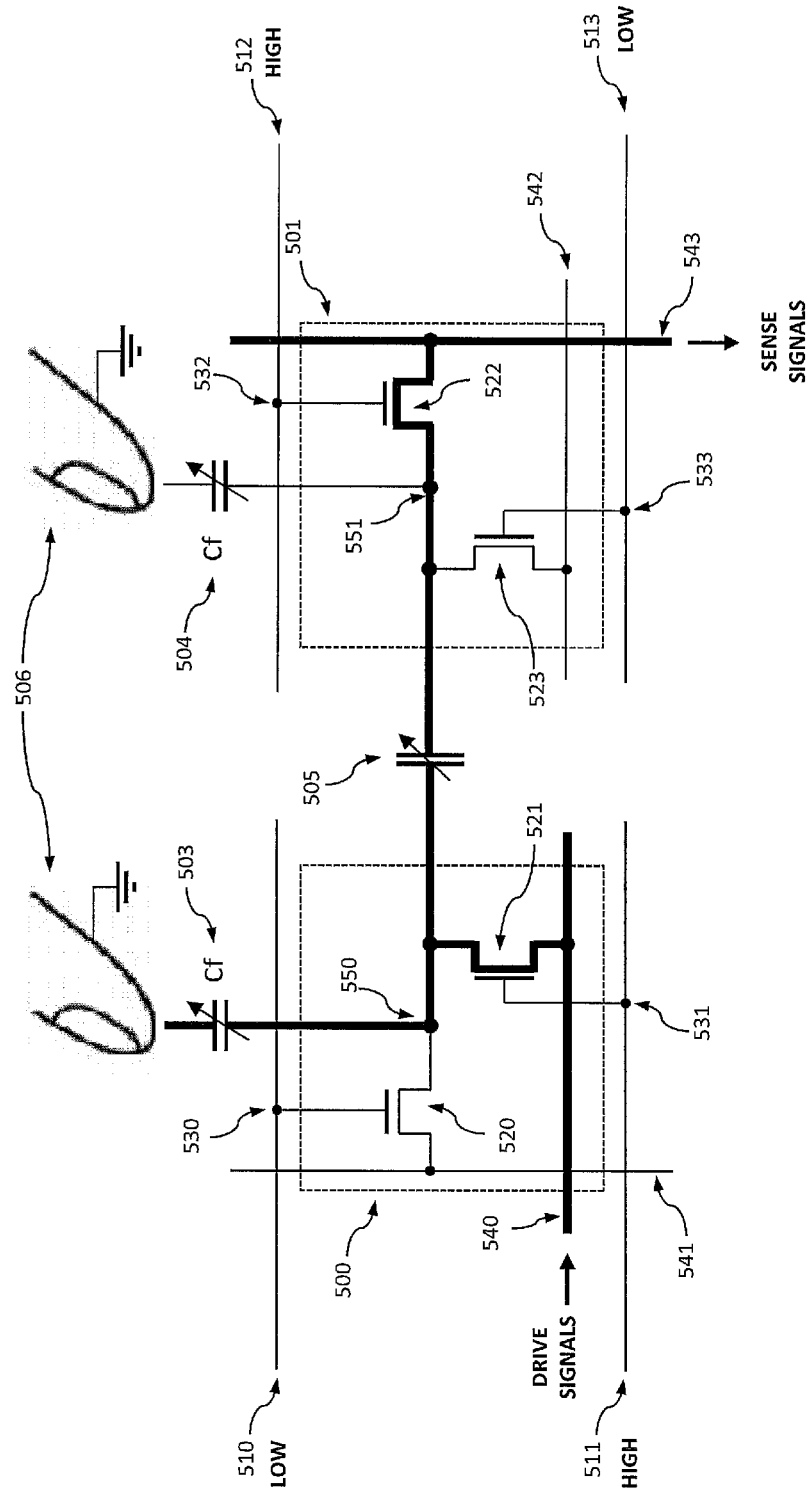

[Fig. 5G]
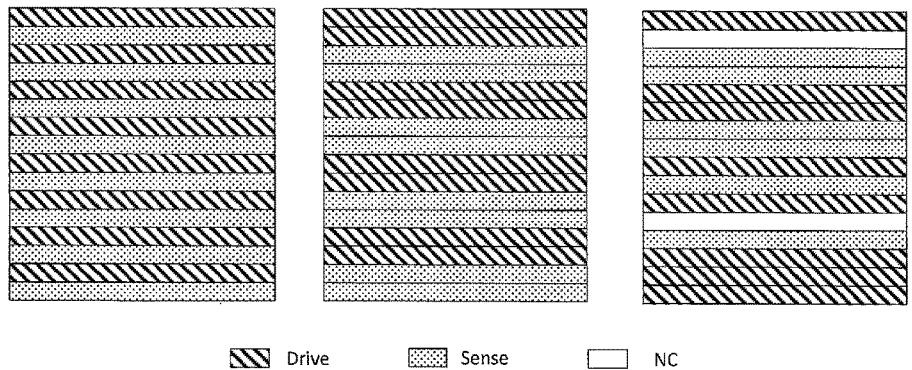
[Fig. 6]
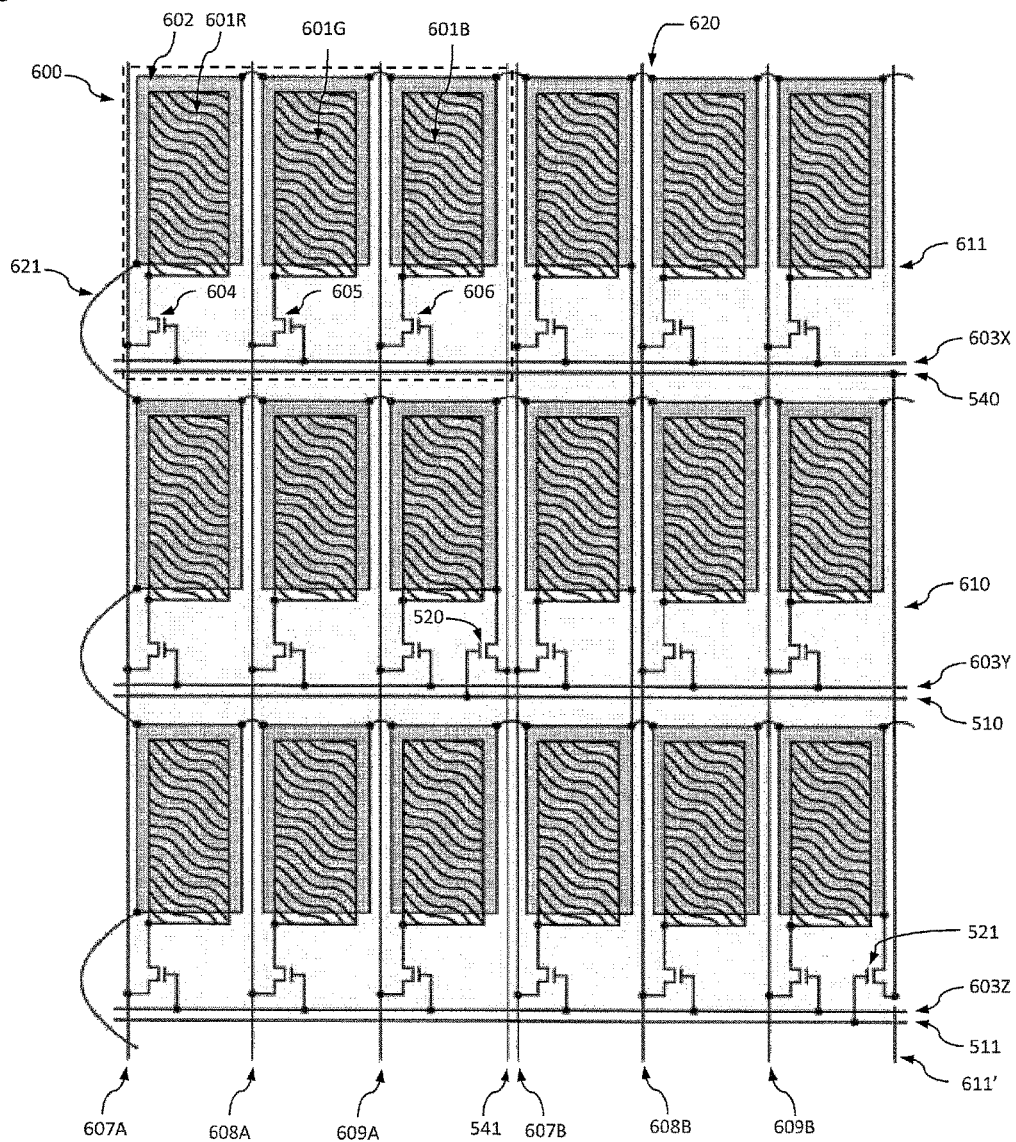

[Fig. 7]
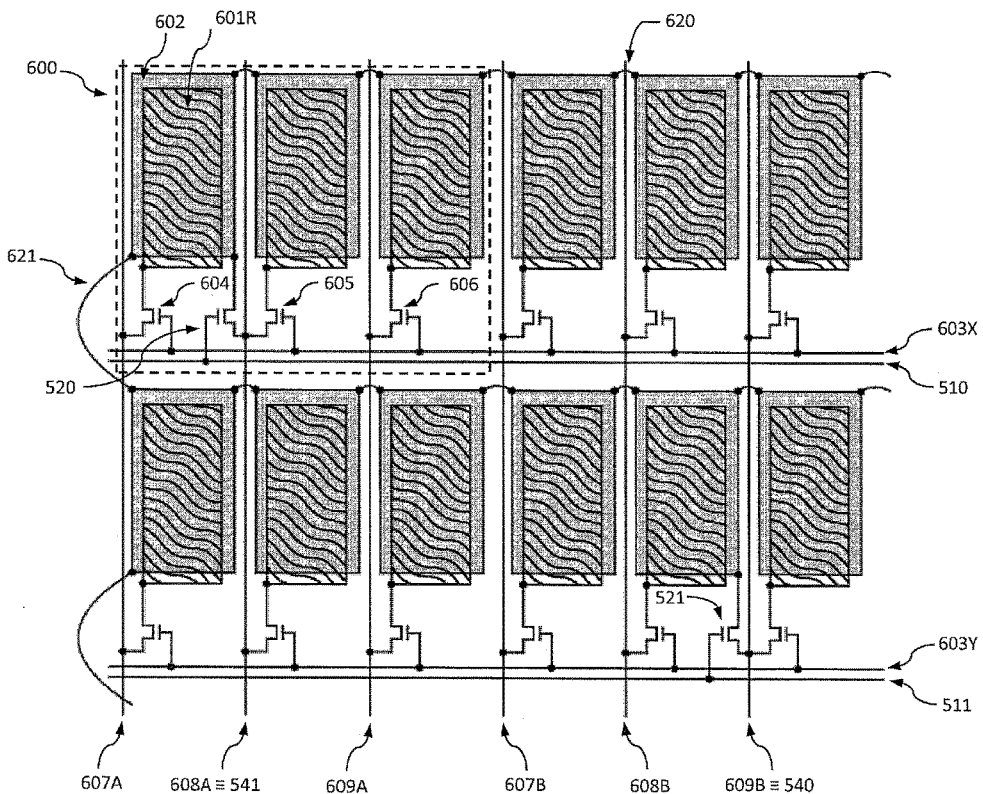
[Fig. 8]

[Fig. 9A]
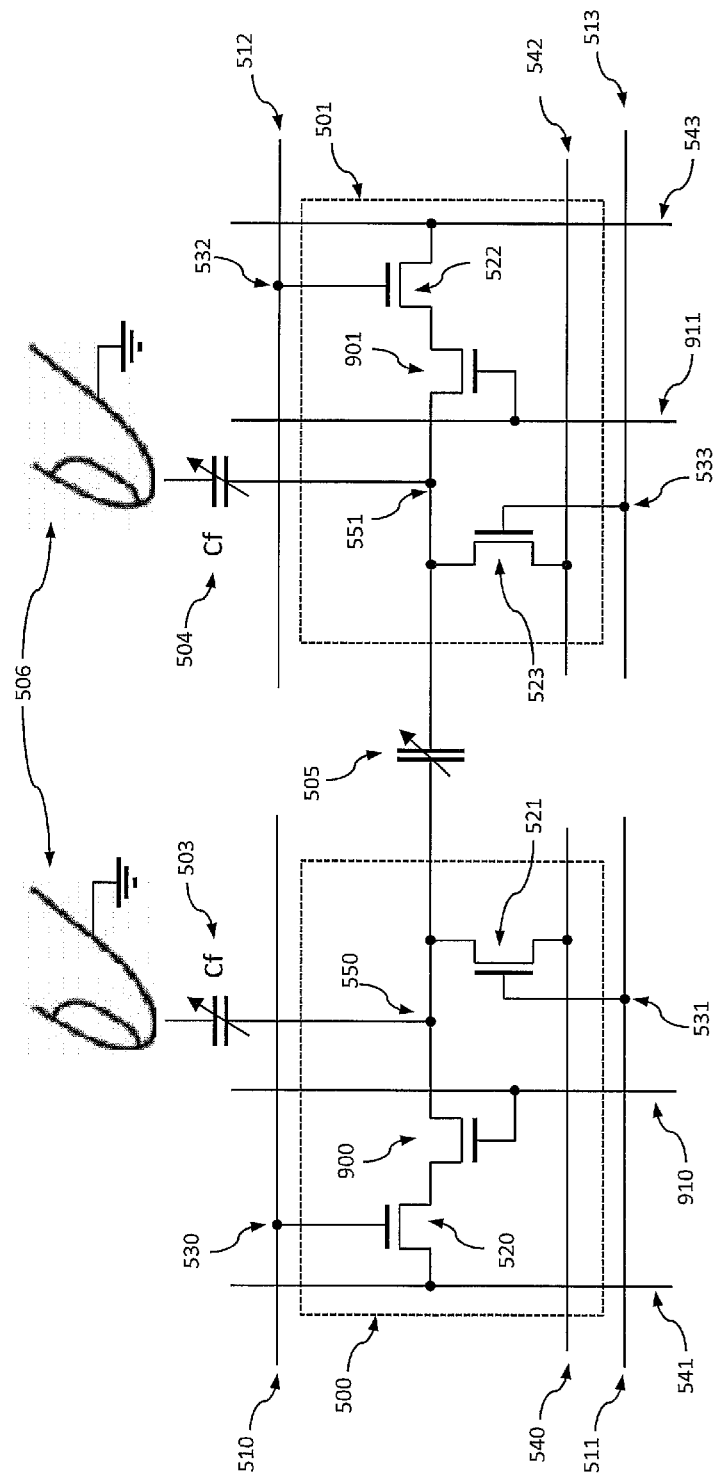

[Fig. 9B]

| Switch | | | | | | | | |
|---|---|---|---|---|---|---|---|---|
| 521 | Open | Open | Open | Open | Open | Close | Close | Close |
| 520 | Open | Open | Close | Close | Open | Close | Open | Close |
| 900 | Open | Close | Open | Close | Open | Open | Close | Close |
| Line connected to node 550 | None | None | None | 541 | 540 | 540 | 540 | 540 & 541 |
| Touch Element State | NC | NC | NC | Sense | Drive | Drive | Drive | Short |

[Fig. 9C]
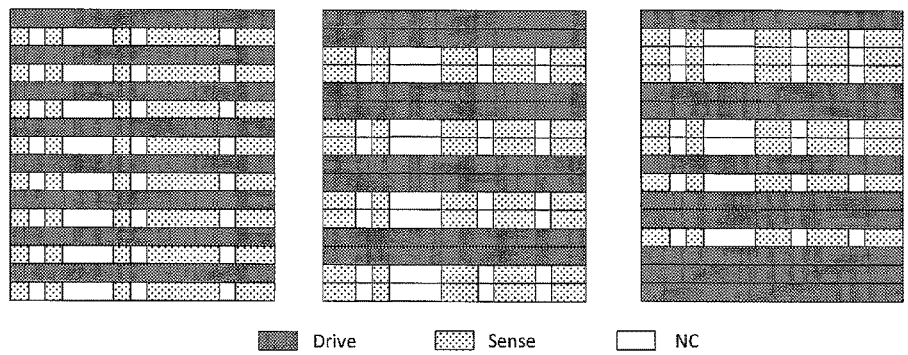
[Fig. 9D]
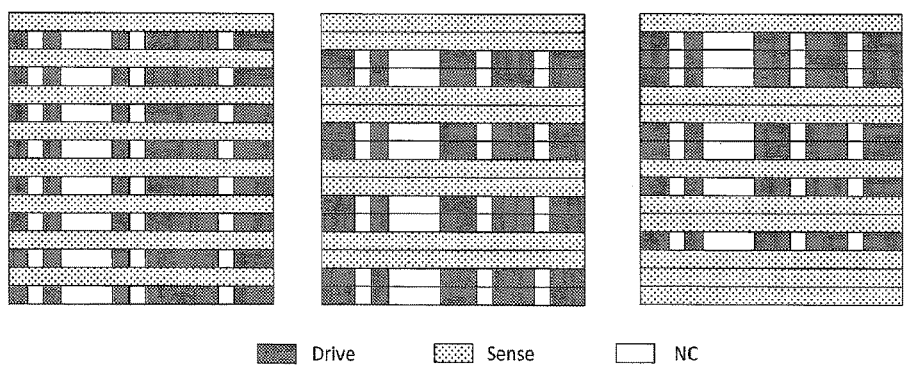
[Fig. 9E]
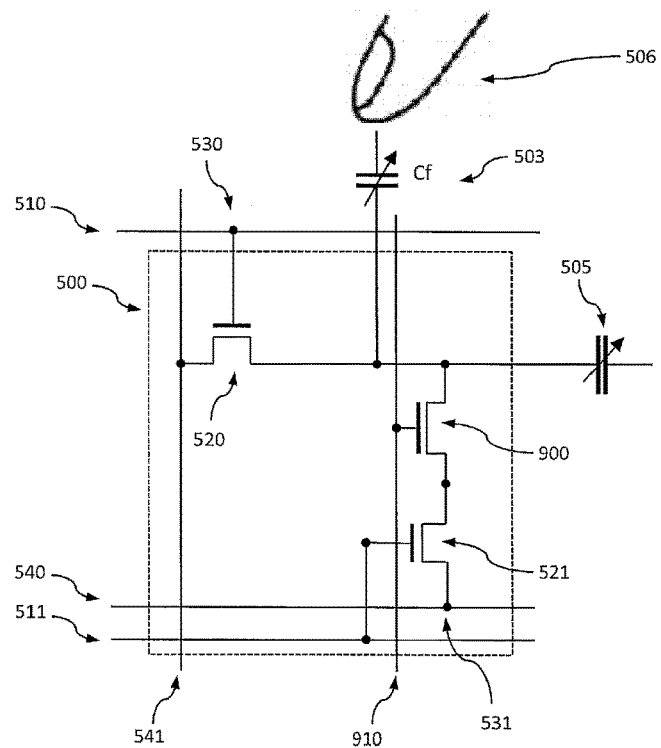

[Fig. 10]
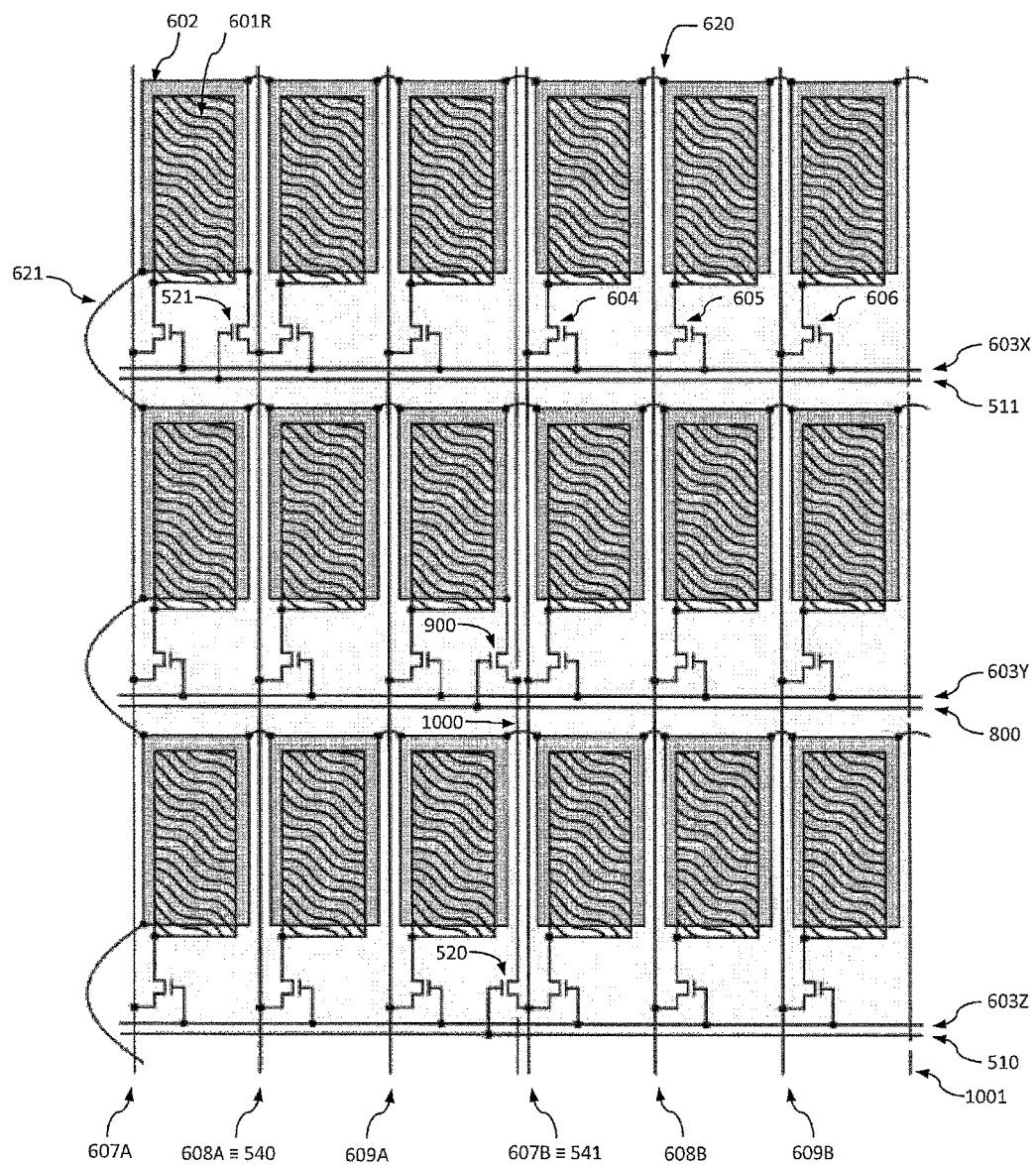

[Fig. 11]
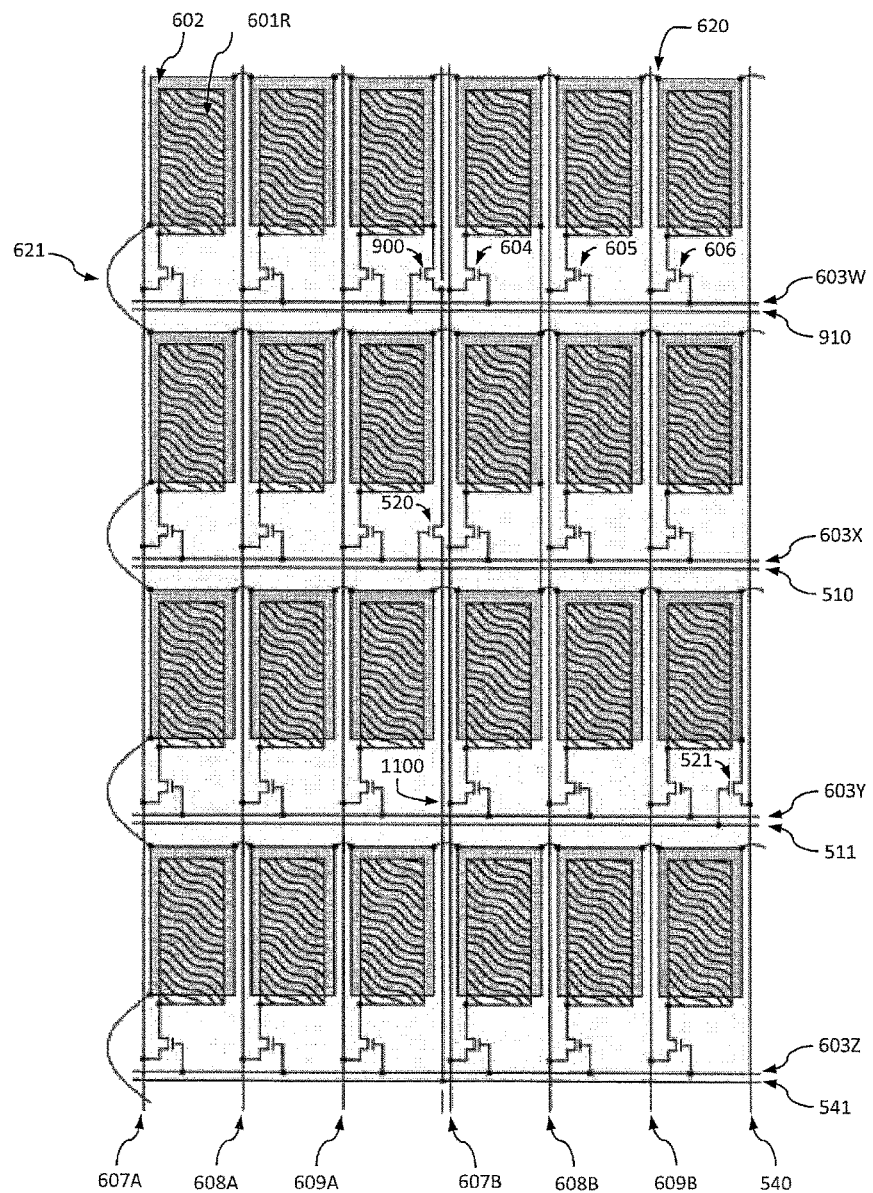

INTEGRATED ACTIVE MATRIX TOUCH PANEL

TECHNICAL FIELD

The present invention relates to touch panel devices. In particular, this invention relates to capacitive type touch panels. Such a capacitive type touch panel device may find application in a range of consumer electronic products including, for example, mobile phones, tablet and desktop PCs, electronic book readers and digital signage products.

BACKGROUND ART

Touch panels have become widely adopted as the input device for a range of electronic products such as smartphones and tablet devices.

Most high-end portable and handheld electronic devices now include touch panels. These are most often used as part of a touchscreen, i.e., a display and a touch panel that are aligned so that the touch zones of the touch panel correspond with display zones of the display.

The most common user interface for electronic devices with touchscreens is an image on the display, the image having points that appear interactive. More particularly, the device may display a picture of a button, and the user can then interact with the device by touching, pressing or swiping the button with their finger or with a stylus. For example, the user can "press" the button and the touch panel detects the touch (or touches). In response to the detected touch or touches, the electronic device carries out some appropriate function. For example, the electronic device might turn itself off, execute an application, etc.

Although, a number of different technologies can be used to create touch panels, capacitive systems have proven to be the most popular due to their accuracy, durability and ability to detect touch input events with little or no activation force.

The most basic method of capacitive sensing for touch panels is the surface capacitive method—also known as self-capacitance—for example as disclosed in U.S. Pat. No. 4,293,734 (Pepper, Oct. 6, 1981). A typical implementation of a surface capacitance type touch panel is illustrated in FIG. 1 and comprises a transparent substrate 10, the surface of which is coated with a conductive material that forms a sensing electrode 11. One or more voltage sources 12 are connected to the sensing electrode, for example at each corner, and are used to generate an electrostatic field above the substrate. When an input object 13 that is electrically conductive—such as a human finger—comes into close proximity to the sensing electrode, a capacitor 14 is dynamically formed between the sensing electrode 11 and the input object 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels is the projected capacitive method—also known as mutual capacitance. In this method, as shown in FIG. 2, a drive electrode 20 and sense electrode 21 are formed on a transparent substrate (not shown). A changing voltage or excitation signal is applied to the drive electrode 20 from a voltage source 22. A signal is then generated on the adjacent sense electrode 21 by means of capacitive coupling via the mutual coupling capacitor 23 formed between the drive electrode 20 and sense electrode 21. A current measurement means 24 is connected to the sense electrode 21 and provides a measurement of the size of the mutual coupling capacitor 23. When the input object 13 is brought to close proximity to both electrodes, it forms a first dynamic capacitor to the drive electrode 27 and a second dynamic capacitor to the sense electrode 28. If the input object is connected to ground, as is the case for example of a human finger connected to a human body, the effect of these dynamically formed capacitances is manifested as a reduction of the amount of capacitive coupling in between the drive and sense electrodes and hence a reduction in the magnitude of the signal measured by the current measurement means 24 attached to the sense electrode 21.

As is well-known and disclosed, for example, in U.S. Pat. No. 5,841,078 (Bisset et al, Oct. 30, 1996), by arranging a plurality of drive and sense electrodes in a grid pattern to form an electrode array, this projected capacitance sensing method may be used to form a touch panel device. An advantage of the projected capacitance sensing method over the surface capacitance method is that multiple simultaneous touch input events may be detected.

Inventions have been disclosed in which the touch panel can switch between self-capacitive and projected capacitive modes by means of switches, for example US2014/0078096A1 (Tan et al., March 2014) applies a method to fixed touch panel patterns. The objective of this capability is to use either mode where and when it is more beneficial for object detection.

Moreover, some inventions allow the change of shape or size of the sense and drive electrodes, or their spatial arrangements. For example U.S. Pat. No. 8,054,300 (Apple, November 2011) proposes a method of reconfigurability by means of switches located on the side of the panel or in a separate board.

In many touchscreens the touch panel is a device independent of the display. The touch panel sits on top of the display, and the light generated by the display crosses the touch panel, with an amount of light being absorbed by the touch panel. In more recent implementations, for example U.S. Pat. No. 7,859,521B2 (Apple, December 2010), part of the touch panel is integrated within the display stack, and touch panel and display may share the use of certain structures, such as transparent electrodes. This integration of the touch panel into the display structure seeks to reduce price by simplifying manufacture, as well as reducing the loss of light throughput that occurs when the touch panel is independent of the display and located on top of the display stack.

Another fully integrated touch panel is described in US 2011/0050585 and U.S. Pat. No. 8,390,582B2 (Apple, March 2011 and March 2013 respectively). This patent uses additional signal lines and transistors to switch between display functionality and self-capacitance touch panel functionality, requiring at least three additional transistors per pixel. Display RGB data lines are connected to source/drain transistor terminals, and act as either voltage drive lines or charge sense lines; this prevents the concurrent driving of touch panel and display.

SUMMARY OF INVENTION

The present invention provides an integrated touchscreen operable in either one of a self-capacitance touch sensing mode and a mutual capacitance touch sensing mode.

As used herein, a "touch screen" is a device that includes both a display and a touch panel, and so is operable both as display and as a touch panel (although not necessarily simultaneously). By "integrated" is meant that at least some components are common to both the touch panel and the display.

A first aspect of the invention provides an integrated touchscreen operable in either one of a self-capacitance touch sensing mode and a mutual capacitance touch sensing mode and comprising a plurality of display pixels arranged in a two-dimensional matrix of rows and columns, each pixel row having an associated display control line and each pixel column having an associated display data line, each pixel including a pixel electrode, a common electrode and a display control switch for selectively connecting the pixel electrode to the display data line associated with the pixel, the display control switch having a control terminal connected to the display control line associated with the pixel;

a matrix of touch elements may be defined in the display pixels, a touch element encompassing an n×m group of touch unit cells, a unit cell comprised of an k×j group of display pixels where k denotes the number of rows of pixels and j denotes the number of columns of pixels;

the common electrodes of the display pixels encompassed in the touch unit cell are electrically connected together to form a common electrode for the touch unit cell; the common electrodes of the unit cells encompassed in the touch element form a common electrode for the touch element;

a touch unit cell may include a conductive lines extending in the row direction and b conductive lines extending in the column direction, where a≤k and b≤j and at least one of a and b is non-zero;

each of the (a+b) conductive lines of a unit cell encompassed by a touch element is connected to the respective conductive line of other units cells encompassed by the touch element;

the touch unit cell include two switching arrangements, one for selectively connecting the common electrode of the touch unit cell to a first touch data line and the other for selectively connecting the common electrode of the touch unit cell to a second touch data line;

and the touchscreen may comprise a controller adapted to operate in either one of a self-capacitance touch sensing mode in which, for at least one touch element, the controller applies an excitation voltage to the common electrode of the touch element and senses a signal generated by the touch element and a mutual capacitance touch sensing mode in which the controller applies an excitation voltage to the common electrode of at least one touch element and determines a signal generated in at least another touch element of the matrix of touch elements.

In a touchscreen of the invention, a "touch element" is constituted by an n×m matrix of touch unit cells, with all touch unit cells of a touch element being connected together in parallel. Thus, a touch element has the same number of control and drive lines as a touch unit cell—for example, in an embodiment in which a touch unit cell has two control lines, one drive line, and one sense line, a touch element will also have the two control lines, one drive line, and one sense line. The number of unit cells forming a touch element may be chosen to provide a touch element of a desired size for easy use. The common electrodes of the unit cells encompassed in a touch element may be electrically connected together to form the common electrode for the touch element. This is however not essential—even if the common electrodes of the unit cells in a touch element are not directly electrically connected together, since each unit cell receives the same control signals from the drive/sense electronics, the collection of common electrodes for the unit cells within a touch element still functions as a single, albeit discontinuous, common electrode for the touch element.

The a conductive lines extending in the row direction and b conductive lines extending in the column direction are provided to allow the touch sensing functionality, and are additional to the display control lines and display data lines that are required to provide the display functionality. The a conductive lines in the row direction and the b conductive lines in the column direction are the only additional conductive lines that are needed to implement the touch sensing functionality.) In some embodiments one or more of the a conductive lines extending in the row direction and/or b conductive lines extending in the column direction are "dummy" lines, provided solely to equalise the aperture ratio of the pixels.

Similarly, the two switching arrangements are additional to the display control switches required to provide the display functionality. (It should be noted that the two switching arrangements may be constituted by a common structural switching arrangement, also long as this provides, at the functional level, a switching arrangement for selectively connecting the common electrode of the touch unit cell to a first touch data line and a switching arrangement for selectively connecting the common electrode of the touch unit cell to a second touch data line. Alternatively, the two switching arrangements may be implemented as separate structural switching arrangements.) In contrast to U.S. Pat. No. 8,390,582 which requires at least three additional switches (transistors) per pixel, the present invention requires only the two switching arrangements to be provided per touch unit cell, that is requires only the two switching arrangements in each k×j group of display pixels. Preferably, therefore, the two switching arrangements are the only two switching arrangements in a touch unit cell. Moreover, in some implementations each switching arrangement may consist of a single switch (eg a single transistor), so that the touch functionality requires just two additional transistors to be provided in a k×j group of display pixels.

The values of n and m may be chosen so that a touch element has a desired size, typically so that its height and width are a few mm. This will usually require that both n and m are greater than 1, for example a touch element may consist of 4 rows of 8 touch unit cells. In principle however a touch element could consist of just one touch unit cell (that is n=m=1) if this provides a touch element of a suitable size. A touch element formed by multiple unit cells present a lower resistivity; this allows higher frequency of operation, which means an increased sample rate, which improves signal-to-noise ratio, and which ultimately improves the accuracy of the touch detection.

It is possible to separate a unit cell into two sub-units, each sub-unit providing only one of the two switching arrangements. A touch element would then be required to include at least one of each of these sub-unit cells. This variant, however, is regarded as an alternative implementation of the ideas disclosed herewith.

In a touch unit cell the a conductive lines extending in the row direction may be disposed in different rows of display pixels encompassed in the touch unit cell. Since the number of conductive lines extending in the row direction is no greater than the number of rows of display pixels in a touch unit cell, this means that each row of display pixels includes at most one additional conductive line, thereby minimising the reduction in aperture ratio. Moreover, if a=k it is possible to provide every pixel row with one conductive line, and this assists in providing a uniform aperture ratio over the display pixels.

Additionally or alternatively, in a touch unit cell the b conductive lines extending in the columns direction may be disposed in different columns of display pixels encompassed in the touch unit cell.

In the self-capacitance touch sensing mode, the controller may, in use, apply the excitation voltage to the common electrode via the first touch data line or the second touch data line.

In the mutual-capacitance touch sensing mode, the controller may, in use, apply the excitation voltage to the common electrode via the first touch data line or the second touch data line.

The one switching arrangement may comprise a first touch control switch connected between the first touch data line and the common electrode, and having a control terminal connected to a first touch sensing control line.

The other switching arrangement may comprise a second touch control switch connected between the second touch data line and the common electrode, and having a control terminal connected to a second touch sensing control line.

The first touch control switch may be disposed in a first display pixel of the display pixels encompassed in the touch element and the second touch control switch may be disposed in a second display pixel of the display pixels encompassed in the touch element, the second display pixel being different to the first display pixel.

The second display pixel may be in a different row of display pixels to the first display pixel.

The second touch sensing control line may be disposed in a different row of display pixels to the first touch sensing control line. Again, this assists with uniformity of aperture ratio over the touch panel.

The first touch data line may be distinct from the display data line connectable to the pixel electrode of the first pixel and the second touch data line may be distinct from the display data line connectable to the pixel electrode of the second pixel; for example the first and second touch data lines may be constituted by two of the conductive lines provided in a touch unit cell. In other implementations of the invention, however, the first touch data line may be constituted by one of the display data lines and/or the second touch data line may be constituted by one of the display data lines.

The first and second touch sensing control lines may be distinct from one another and from the display control lines.

The one switching arrangement may further comprise a third touch control switch connected in series with the first touch control switch between the first touch data line and the common electrode, and having a control terminal connected to a third touch sensing control line. This allows touch panel elements in the same row to be put into different states, and provides greater flexibility in operation.

The other switching arrangement may alternatively further comprise a third touch control switch connected in series with the second touch control switch between the second touch data line and the common electrode, and having a control terminal connected to a third touch sensing control line. This allows touch panel elements in the same column to be put into different states, and provides greater flexibility in operation.

The third touch control switch may be disposed in a third display pixel of the display pixels encompassed in the touch element, the third display pixel being different to the first display pixel and to the second display pixel.

The third touch sensing control line may be in a different row of display pixels to the first touch sensing control line and to the second touch sensing control line. This assists in providing a uniform aperture ratio over the display pixels.

The controller may be further operable to, for at least one touch element, isolate the common electrode of the touch element from both the first touch data line and the second touch data line.

The controller is further operable to, for at least one touch element, simultaneously connect the common electrode of the touch element to both the first touch data line and the second touch data line.

The first touch data line and the second touch data line may be distinct from the display data lines, for example may be constituted by two of the conductive lines provided in a touch unit cell. In this embodiment, the controller may be operable, while supplying an excitation voltage to at least one of the touch elements, to simultaneously write display data to one or more display pixels in rows of display pixels different from the rows of display pixels not encompassed in the at least one touch element.

At least one of the first touch data line and the first touch data line may extend in the row direction and may be provided in a row of display pixels.

Alternatively, in other implementations of the invention the first touch data line may be constituted by one of the display data lines and/or the second touch data line may be constituted by one of the display data lines. This reduces the number of conductive lines that need be provided in a touch unit cell to implement touch functionality, although it may not be possible to simultaneously provide display and touch functionality.

The k×j group of display pixels may have k≥2 or k≥3 and/or may have j≥2. In one embodiment k=j=2, and in another embodiment k=3 and j=2.

The first display pixel and the second display pixel may be in different columns of display pixels.

In a touch panel according to the invention, a touch element may be selected to have one of two or more possible functionalities (such as drive (display) and sense; drive (display), sense and not-connected; or drive (display), sense, not-connected and shorted.) In some embodiments the functionality of touch elements is selectable for a row (or column) of touch elements, independent of the functionality selected for other rows (or columns) of touch elements. In other embodiments the functionality a touch element is selectable independent of the functionality selected for other touch elements.

The present invention relates to a capacitive touch panel which shape, size and function is selectable by means of an active matrix of thin film transistors (TFTs), which are integrated in the display electronic substrate, and which are distributed across a plurality of display pixels.

The touch panel is composed of a collection of touch panel elements. These touch panel elements can be selected to behave as drive or sense elements by means of addressing lines and TFTs, these lines and TFTs forming an active matrix. Sense elements can work independently of each other in self-capacitive mode, or can be associated to other touch elements functioning as drive elements to work in mutual capacitance mode. Multiple touch panel elements may be operated as sense elements in conjunction with one touch panel element operated as a drive element so as to sense independently differing regions of the electric field projected by the drive element.

When a touchscreen of the invention is operated in a mutual capacitance sensing mode it is possible for two or more adjacent rows (or columns) of touch panel elements to be selected as drive elements and/or two or more adjacent rows (or columns) of touch panel elements to be selected as sense elements. Thus, several touch panel elements can be selected as a group to work concomitantly as a composed sense or drive electrode, with size and shape determined by the overall size and shape of the group of elements. Groups of sense electrodes can work in self-capacitive mode, or in conjunction with other drive electrodes or groups of drive electrodes in mutual capacitive mode. The grouping of touch elements is also accomplished by the combination of the aforementioned TFTs and signals in the lines of the active matrix.

The signal lines and TFTs of a touch panel element may be integrated in the same electronic substrate as the display pixels, in some cases even sharing signal lines and TFTs with the display system. The touch element's TFTs and signals do not need to be located at a particular location within the area covered by the element, but may be distributed among the plurality of pixels associated to the touch element. Despite the integration of touch and display functions in the same electronic substrate, some embodiments of this invention are capable of driving the touch panel and the display concurrently.

BRIEF DESCRIPTION OF DRAWINGS

FIG. 1 is a schematic view of a self capacitance (or surface capacitance) touch panel;

FIG. 2 is a schematic view of a mutual capacitance or (projected capacitance) touch panel;

FIG. 3A is a schematic sectional view of a touch screen;

FIG. 3B is a schematic sectional view of a touch screen having an integrated touch and display layer;

FIG. 4 is a schematic view of an active matrix touch panel according to an embodiment of the invention;

FIG. 5A is an equivalent circuit diagram of two touch unit cells of a touch panel according to an embodiment of the invention;

FIG. 5B illustrates the relation between a touch unit cell and a touch element in one embodiment of the invention FIG. 5C is an equivalent circuit diagram of one touch unit cell of FIG. 5A operating as an element of a self-capacitance touch panel;

FIG. 5D illustrates a two-stage method of self-capacitance operation

FIG. 5E illustrates another two-stage method of self-capacitance operation

FIG. 5F is an equivalent circuit diagram of the touch unit cells of FIG. 5A operating as elements of a mutual capacitance touch panel;

FIG. 5G is a schematic view of three functional patterns possible with the touch elements of FIG. 5A;

FIG. 6 is a partial plan view of an integrated active matrix touch panel implementing the present invention;

FIG. 7 shows a possible driving scheme for the touch panel of FIG. 6A;

FIG. 8 is a partial plan view of another integrated active matrix touch panel implementing the present invention;

FIG. 9A is an equivalent circuit diagram of two touch unit cells of a touch panel according to another embodiment of the invention;

FIG. 9B illustrates operation of the two touch unit cells of FIG. 9A;

FIG. 9C is a schematic view of three functional patterns possible with the touch unit cells of FIG. 9A;

FIG. 9D is a schematic view of three functional patterns possible with modified touch unit cells of FIG. 9A;

FIG. 9E is an equivalent circuit diagram of a touch element of a touch unit cell according to another embodiment of the invention;

FIG. 10 is a partial plan view of another integrated active matrix touch panel implementing the present invention; and FIG. 11 is a partial plan view of another integrated active matrix touch panel implementing the present invention.

DESCRIPTION OF EMBODIMENTS

The present invention provides a capacitive touch sensor that may be used, for example, in touch panel display systems or the like. FIG. 3A shows a schematic view of a cross section 30 of an example touch screen, i.e. a combination of display and touch panel. The touch panel 31 and display 32 are physically separated, and typically the touch panel may be located below the cover glass, although the order and arrangement of the layers may be different. Touch panel controller 33 and display driver 34 control the touch panel and display functionalities respectively, and they are both controlled by the panel processor 35. Alternatively, as shown in cross section 36 of FIG. 3B, the display and touch sensor may be integrated in the same layer 37, which is sandwiched between the other display layers.

FIG. 4 illustrates the principle of an active matrix touch panel. The touch panel 40 comprises a plurality of touch elements 41, each of which is composed of a plurality of unit cells 42, where a unit cell is defined as the smallest structure having complete touch functionality. A unit cell covers a plurality of display pixels 45. Each touch panel element is connected to a plurality of signal lines 43 and 44. The crossing of signal lines 43 and 44 over a certain touch element symbolizes that that touch element functionality is controlled by a particular set of signal lines. It does not imply that there is one horizontal line only and one vertical line only per touch element, but a plurality of lines in the horizontal and vertical directions, or at any other angle as required by the particular embodiment. The crossing of signal lines in a touch element is drawn over a particular touch unit cell for visualisation purposes, but it does not necessarily imply that this crossing is associated in any way with a particular unit cell. The functional relation between touch panel elements, unit cells and display pixels will be detailed subsequently in the embodiments' descriptions, and cannot be deduced from this figure alone.

FIG. 5A is a general schematic of a basic design which will be the starting point for the understanding of embodiments of this invention, described further below. Two touch unit cells 500 and 501 influence each other through their mutual capacitance 505. These touch unit cells are also influenced by the presence of an object, in this case a human finger 506, through the capacitances 503 and 504 respectively.

On touch unit cell 500, capacitances 503 and 505 are connected at the common node 550, which is a conductive element joining the conductive plates of capacitances 503 and 505 to the active matrix circuit. Electronics switches (for example, transistors such as TFTs in FIG. 5A) 520 and 521 are used to select which of the data lines 540 and 541 are connected to common node 550. This selection depends on the voltage present at the gate nodes 530 and 531, as controlled by respective control lines 510, 511. When gate 530 is in a high state, transistor 520 connects data line 541 with common node 550. When gate 531 is in a high state, transistor 521 connects data line 540 with common node 550.

On touch unit cell 501, capacitances 504 and 505 are connected at the common node 551, which is a conductive element joining the conductive plates of capacitances 505 and 504 to the active matrix circuit. Transistors 522 and 523 are used to select which of the data lines 542 and 543 are connected to common node 551. This selection depends on the voltage present at the gate nodes 532 and 533, as controlled by respective control lines 512, 513. When gate 532 is in a high state, transistor 522 connects data line 543 with common node 551. When gate 533 is in a high state, transistor 523 connects data line 542 with common node 551. Transistor gates 530, 531, 532 and 533 are actuated by means of control lines 510, 511, 512 and 513 respectively.

As will be understood, each touch unit cell has two control lines and two data lines. Touch unit cell 500 has two control lines 510, 511 and two data lines 540, 541, whereas touch unit cell 501 has two control lines 512, 513 and two data lines 542, 543. In this embodiment the two control lines and one data line 540 (or 542) extend generally along the row direction and the other data line 541 (or 543) extends generally along the column direction, but the invention is not limited to this configuration for the control lines and data lines.

The control lines 510, 511 (512, 513) of FIG. 5A and the data lines 540, 541 (542, 543) of FIG. 5A implement touch functionality, and so may be considered as "touch control lines" and "touch data lines" respectively. It should be understood however that referring to, for example, a data line as a "touch data line" does not necessarily mean that that data line implements only touch functionality—in some embodiments described below a data line may be used to implement both touch functionality and display functionality, and in principle a control line may be used to implement both touch functionality and display functionality. It should also be understood that a control [data] line is only explicitly referred to herein as a "touch" control [data] line" or a "display" control [data] line" where this is necessary for clarity.

The data lines 540, 541 (542,543) are connected to respective drive circuits (not shown) for supplying drive signals to the data lines. In addition, one of the data lines is also connected to a sensing circuit (not shown) to allow operation in a self-capacitance mode. In the foregoing description it will be assumed that the data line 541 (543) that extends generally along the column direction is connected to a sensing circuit, but it should again be understood that this is only by way of example and the invention is not limited to this configuration. The data line 541 may therefore also be considered as a "sensing data line" (or "sensing/drive data line") and the data line 540 may be considered as a "drive data line". Preferably the drive circuit and sensing circuit connected to the data line 541 (543) are embodied as a combined drive/sensing circuit. The drive circuit and the drive/sensing circuits may conveniently be constituted in the touch panel controller (shown as 33 in FIG. 3A or 3B).

As is described below, a touch unit cell is formed of a group, typically a rectangular group, of display pixels. The common electrodes of these pixels are joined together to form the common electrode of the touch unit cell. A touch unit cell is therefore likely to have typical dimensions of the order of 100 µm or a few hundreds of µm, and so may be smaller than desired for convenient use of the touch panel. In a practical implementation, one or more unit cells (500 in FIG. 5A) may be connected in parallel to form a touch element. The common electrodes of these unit cells, which may be connected together, form a common electrode of the touch element. The number of unit cells forming a touch element is chosen to provide a touch element of a desired size for easy use, for example, 4 mm wide and 2 mm high. Hence, the number of unit cells in a touch element may be as high as hundreds. The control and data lines of the unit cells constituting a touch element are respectively connected together, so that the touch element has one CONTROL-A line, one CONTROL-B line, one DRIVE line and one SENSE line. A touch panel is formed by an array of one or more of these touch elements arranged as a matrix, plus the connecting lines to the respective control and data lines. (It should be noted that in principle a touch element could consist of only one touch unit cell, in a case where this would provide a touch element of suitable size.)

This is illustrated by way of example in FIG. 5B, which at the top shows a touch unit cell having two control lines 510,511 (or "control-A", "control-B"), a drive data line 540 and a sensing data line 541 and embodied as a matrix of display pixels as denoted by the broken lines. (As is explained below, the 3×2 matrix of display pixels indicated in the touch unit cell in FIG. 5B is by way of example only, and the invention is not limited to this.) FIG. 5B further shows that each touch element is composed of a plurality of unit cells—for example of 4 rows and 8 columns of unit cells (32 unit cells)—and the touch panel is composed of a plurality of touch elements—for example of 5 rows and 9 columns of touch elements (45 touch elements). The touch panel has 5 CONTROL-A lines (one for each row of touch elements), 5 CONTROL-B lines (one for each row of touch elements) and 5 DRIVE lines (one for each row of touch elements). The 5 CONTROL-A lines are addressable independently from one another, but may be grouped together in a common bus, as shown in FIG. 5B. The 5 CONTROL-B lines and the 5 DRIVE lines may similarly be arranged in respective common buses but keeping the lines individuality. Similarly, the panel has 9 SENSE lines (one for each row of column elements), which are individually addressable but which may be grouped together in a SENSE bus.

It should be understood that the invention does not necessarily require that every touch unit cell in a touch element (where a touch element contains more than one unit cell) must be identical to another. As noted above, the minimum requirement is that a touch element contains switching arrangements for connecting the common electrode of the touch element to the sense data line and to the drive data line. However, making all touch unit cells the same as one another, so that switching arrangements are provided in every unit cell, may simplify design of the touch panel.

The circuit described above can be operated in self capacitance or mutual capacitance modes, depending on the state of the control lines, as selected by the touch panel controller. FIG. 5C illustrates an example way of operating a touch unit cell in self-capacitance mode. Control lines 510 and 511 are in high and low states, respectively. Hence, electronic switch 520 is closed, allowing the passage of current, whereas electronic switch 521 is open, blocking the passage of current. Under these conditions, capacitances 503 and 505 are connected to data line 541. Touch panel controller 33 may then excite line 541 with a known voltage signal and determine the capacitance of the line via the drive/sensing circuit connected to the line 541, for example by sensing the resultant current. By analysing the value of this capacitance and/or changes in the value of this capacitance the touch panel controller can infer information about the proximity of an object, such as finger 506.

When control lines 510 and 511 are in the high and low states respectively, switch 520 will be closed in every touch unit cell of the row of touch elements controlled by this pair of control lines. The touch elements may be driven one at a time, by applying a suitable excitation voltage to the sense line 541 of one touch element and sensing the resultant signal, and then repeating this for other touch elements of the row in sequence. This procedure may be repeated for another row of touch elements, and so on. Alternatively, the controller could excite and sense all the touch elements in a row simultaneously.

In FIG. 5C the resultant signal is sensed while the touch element is being excited by the voltage signal. As an alternative, FIG. 5D illustrates a two-stage self-capacitance method of operation. In the first stage, a touch unit cell is operated by applying an excitation signal to the common node 550 via the drive line 540 and the switch 521 (with switch 520 being open). This way, the excitation signal charges the capacitances connected at node 550. In the second stage, shown in the right hand view of FIG. 5D, the switch 521 is open and the switch 520 is closed so that the common node is connected to the sense line 541. The charge stored in capacitance 550 is then discharged through sense line 541 and measured by the sensing circuitry. Alternatively, as in FIG. 5E, the first stage may consist of charging the capacitance of node 500 by excitation of the touch unit cell through line 541, followed by a subsequent discharge (stage two) also through line 541.

FIG. 5F illustrates an example way of operating two touch unit cells in mutual capacitance mode. Control lines 510, 511, 512 and 513 are in states low, high, high and low, respectively to put touch unit cell 500 in the drive state and to put touch unit cell 501 in the sense state. It will be understood that, in a practical implementation of the invention, the control lines 510, 511 (512,513) will extend over the entire length of a row of touch elements, as depicted in the example of FIG. 5B. Thus, for touch unit cell 501 of FIG. 5D to operate as a sense element in a mutual capacitance sensing mode while touch unit cell 500 operates as a drive element requires that touch unit cell 501 is in a different row of touch elements to touch unit cell 500.

Putting control lines 510, 511, 512 and 513 in states low, high, high and low, respectively, makes switches 520, 521, 522 and 523 to be open, close, close, open, respectively. Under these conditions, node 550 is connected to data line 540, whereas node 551 is connected to data line 543. Touch panel controller 33 may then excite data line 540 with a known signal (which may be the same as or different to the signal used in the self-capacitance mode of FIGS. 5C and 5D) via the drive circuit connected to data line 540, and read the return signal through data line 543 via the sensing circuit or drive/sensing circuit connected to the data line 543. That is, touch unit cell 500 can be considered as being in the "drive" state and touch unit cell 501 can be considered as being in the "sense" state. This return signal contains information of the mutual coupling between touch unit cells 500 and 501. Analysing the changes in the coupling, the touch panel controller can infer information about the proximity of an object, such as finger 506. As may be observed, in the configuration of FIG. 5F touch panel unit cells 500 and 501 behave respectively as drive and sense electrodes in a mutual capacitance measuring scheme.

When both switches 520 and 521 are open at the same time, the touch unit cell 500 is in a not-connected (hereon "NC") state. Under this conditions, node 550, and consequently capacitances 503 and 505, are isolated from both data lines 540, 541 and consequently from the rest of the touch circuitry. This state may be useful when there is no wish to sense all the touch elements, and may lead to an energy saving. Alternatively, when both switches 520 and 521 are closed, node 550 is connected to both data lines 540 and 541; this state, referred hereon as the "short" state, may be used for a variety of accessory tasks, such as to discharge parasitic capacitances.

Touch elements such as those described above may be grouped together according to functionality by using the control and data lines, resulting in touch groups of different shapes and sizes. Individual touch elements or groups of touch elements may work as selfcapacitance sensing electrodes. Alternatively, by combining elements or groups of touch elements with drive and sense functionality, the touch panel may operate in mutualcapacitance mode. FIG. 5G shows examples of functional patterns that are possible with the circuital scheme of FIG. 5C. In this example, if touch unit cell 500 is put into one state, for example the drive state, by supplying appropriate control voltages to the control lines 510, 511, then all other touch unit cells associated with the control lines 510, 511 will also be put into the same state; similarly, if touch element 501 is put into a state, for example the sense state, by supplying appropriate control voltages to the control lines 512,513, then all other touch unit cells associated with the control lines 512, 513 will be put into the same state. This is also true for the NC state or the short state. It will therefore be understood that, in a touch panel where all touch elements of a row are controlled by the same control lines 510, 511 (512,513), as in the example of FIG. 5B, all touch elements of a row must be in the same state as shown in the patterns of FIG. 5G.

A first embodiment of the invention is depicted in FIG. 6, which is a partial plan view of a touch panel according to an embodiment of the invention where a touch panel unit cell having the general structure described in FIGS. 5A-5F is integrated in a group of six display pixels arranged as a 3×2 group (that is, three rows and two columns of display pixels). Only one touch unit cell is shown in FIG. 6. The discontinuous line surrounds a typical structure of a display pixel (600). This embodiment relates to a full colour display, so that a display pixel 600 consists of red, green and blue sub-pixels each having a pixel electrode 601R, 601G, 601B, common electrode 602 (usually referred to as VCOM electrode), display gate line 603, a display transistor 604, 605 and 606, and R, G or B display data lines 607, 608 and 609 as appropriate. (In FIG. 6 the R, G or B display data lines for the first pixel column are labelled 607A, 608A and 609A to distinguish them from the R, G or B display data lines for the second pixel column which are labelled 607B, 608B and 609B. Similarly the display gate line for the top pixel row is labelled 603X to distinguish it from the display gate line for the second pixel row which is labelled 603Y, and so on.)

In a conventional display a display pixel would be provided with the display gate line 603, and the R, G and B display data lines 607, 608 and 609, since these are required to allow the pixel electrodes 601R, 601G, 601B to be driven to display a desired image. In the embodiment of FIG. 6, however, each pixel has an additional portion of horizontal conductive line under the display gate line, and an additional portion of vertical conductive line at the right of the pixel.

These additional portions of horizontal conductive lines, and one set of the additional portions of vertical conductive lines, are continuous between adjacent pixels in a row or column respectively and join together in the 3×2 pixel array to constitute the touch control lines 510 and 511 (in this example extending in the row direction), and the touch data lines 540 and 541 (in this example extending in the row direction and the column direction respectively).

In a conventional display a display pixel would further be provided with the display transistors 604, 605 and 606, as these are required to allow the red, green and blue pixel electrodes 601R, 601G, 601B to be selectively connected to, or isolated from, the R, G and B display data lines 607, 608 and 609. In the embodiment of FIG. 6, however, two further transistors 520, 521 are provided in the touch panel element. Transistor 520 is connected between the common electrode of one pixel in the left column of pixels in FIG. 6 and the touch data line 541 and has its gate connected to the touch control line 510, and transistor 521 is connected between the common electrode of one pixel in the right column of pixels in FIG. 6 and the touch data line 540 and has its gate connected to the touch control line 511. Transistors 520 and 521 are present only on two of the six pixels (middle left and bottom right on the example of FIG. 6).

In some pixels, such as middle and bottom pixels on the right, the vertical portion of conductive line (610) serves as an internal interconnection between touch sensing data line 540 and transistor 521. In other pixels, such as the top right pixel, the vertical portion of conductive line (611) is a dummy electrode included to guarantee uniformity of the aperture ratio across the structure. (The vertical portion of conductive line 611' is a dummy electrode that corresponds to the vertical portion of conductive line 611 but is for the touch panel unit cell below the touch panel unit cell shown in FIG. 6.)

The VCOM electrodes 602 of the pixels comprehended by a touch element form a common VCOM electrode having approximately the same size as the touch element. As noted the VCOM electrodes 602 of all pixels in a touch element may be electrically connected together, and this is symbolised in FIG. 6 by conductive bridges 620 and 621 that connect the VCOM electrodes of the pixels in the unit cell to one another, and by further conductive bridges that connect the VCOM electrodes of the pixels in the unit cell to VCOM electrodes of pixels (not shown) in an adjacent unit cell. (It is assumed that the touch unit cell of FIG. 6 is the upper left touch unit in a touch element, and so the VCOM electrode is not shown as connected to the VCOM electrode of a touch unit cell to the left of, or above, the touch unit cell shown in FIG. 6 as these are not in the same touch element.) However those skilled in the art would acknowledge that forming a common VCOM electrode may be accomplished in practice in a variety of ways, such as fabricating an unbroken VCOM electrode of the size of the touch element, and shared by all the pixels covered by it. This common VCOM electrode is then electrically connected to node 550; in this way, the common VCOM electrode becomes physically one of the conductive plates of capacitances 503 and 505.

As noted the 3×2 display pixel grouping shown in FIG. 6 is, in this embodiment, the smallest pixel grouping that can provide a touch unit cell. However, larger pixel groupings than this smallest pixel grouping may be used to provide a touch unit cell.

Integrating a touch unit cell having the general structure described in FIGS. 5A, and 5C-5F into a 3×2 group of display pixels has the advantage that providing one additional conductive line in the row direction in each pixel provides the touch control lines 510, 511 (512, 513) and one touch data line 540 (541), and that providing one additional conductive line in the column direction in each pixel provides the other touch data line 541 and the conductive line 610 that serves as an internal interconnection. A 3×2 group of display pixels is therefore, in this embodiment, the smallest pixel grouping in which the additional conductive lines required to provide the touch functionality can be provided while providing one, and only one, additional conductive line in the row direction per pixel and one, and only one, additional conductive line in the column direction per pixel. Integrating the touch unit cell into a smaller pixel block than a 3×2 pixel block would require providing two additional conductive lines in the row direction in one pixel or would require providing two additional conductive lines in the column direction in one pixel—and this could significantly reduce the aperture ratio of the pixel.

Those skilled in the art would understand that the touch unit cell structure presented in FIG. 6 may be padded in the row direction and/or the column direction with additional display pixels, so that a touch element may alternatively encompass 4×2 pixels, 5×2 pixels, 3×3 pixels, etc. Any such additional display pixels included in a touch unit cell are not required to be provided with transistors for touch sensing (although these additional display pixels would contain transistors corresponding to the transistors 604, 605, 606 to enable the pixels to display a desired image), as particular designs may demand. Also, switching the role of data lines 540 and 541, and/or control lines 510, 511, 512 and 513, and/or reversing the horizontal and vertical directions, would result in further embodiments that are variations of the described embodiment. Any such additional display pixels included in a touch unit cell are preferably provided with a dummy conductive line in the row direction and a dummy conductive line in the column direction, so as to have the same optical aperture as the pixels shown in FIG. 6.

Similarly, a touch element may be padded in the row direction and/or the column direction with additional display pixels, with the same considerations as above. That is, two touch unit cells in a touch element do not need to be adjacent to one another but may for example be separated by one or more rows, or columns, of display pixels that have no touch functionality.

It should be understood that FIG. 6 shows only electronic/electrical components of the structure. Components such as the polarisers, colour filters and display medium of FIG. 3A or FIG. 3B are not shown in FIG. 6.

There are several novel aspects in the structure described in FIG. 6. Each pixel has a horizontal conductive portion and a vertical conducting portion for the purpose of touch sensing. This constant pattern guarantees a homogeneous optical aperture across the structure. Also important is the fact that switching elements 520 and 521 are not required in all pixels, but only in some of the pixels associated with the touch element (two of the six display pixels of FIG. 6), the remaining pixels not containing transistors for touch function. This saves space on the electronics layer, and simplifies the design. Additionally, the NC state is a feature that allows saving energy when operating the touch panel. This may find use in applications where energy usage must be minimised.

Moreover, the embodiment of FIG. 6 allows the concurrent operation of the touch panel and the display. To avoid crosstalk between display and touch driving circuitries, the touch circuitry may be driven only on those rows currently waiting for a display refresh cycle. This is possible due to the independent addressing schemes of touch and display functionalities of this embodiment. A possible driving scheme allowing this feature is illustrated in FIG. 7, for a configuration having k pixel rows per touch element row, and a total of N touch rows. Touch and display driving are symbolised by the capital letters "T" and "D" respectively. In a typical display, the display driver scans the display rows sequentially, e.g. from top to bottom. After a pixel row has been refreshed, it goes inactive from the display point of view until the display driver has scanned the rest of the screen. During this display-inactive time, the row of pixels is addressable by the touch panel. When the k pixel rows associated with a row of touch elements have been refreshed, the touch panel controller may start driving that row of touch elements. Hence, the touch panel driver may be sensing anywhere across the touch panel except on the touch elements whose pixels are currently being refreshed by the display driver.

In the embodiment of FIG. 6, the touch data lines 540 and 541 of FIG. 5A are implemented as additional conductive lines added to the display electronic layer. In other embodiments, these data lines may be implemented by means of reusing already existing conductive lines. FIG. 8 provides an example of such an embodiment, where existing RGB display data lines perform the roles of touch data lines 540 and 541. (As with FIG. 6, FIG. 8 is a partial plan view of a touch panel, showing only one touch unit cell.) More precisely, in FIG. 8 the green display data line of the left column (608A) fulfils the role of the touch drive/sense data line 541, and the blue display data line of the right column (609B) fulfils the role of the touch drive data line 540. The vertical conductive lines 610 and 611 of FIG. 6 are not necessary in this embodiment, and have been eliminated. In order to decouple touch and display functionality, touch control lines 510 and 511 control the electronic switches 520 and 521, which connect or disconnect lines 608A and 609B from the VCOM electrode 602. These touch control lines 510 and 511 operate orthogonally to the display gate lines 603X, 603Y. Hence, in this embodiment the concurrent driving of touch and display functions of the previous embodiment is not applicable.

In the embodiment of FIG. 8, the unit cell of the touch element may be implemented as a 2×2 grouping of display pixels. This is possible because the touch drive data line 540 and the touch drive/sense data line 541 are implemented by reusing already existing conductive lines (namely display data lines), so only the touch control lines 510 and 511 are required to be provided as additional conductive lines added to the display electronic layer. The touch control line 510 can be provided in one pixel row and the touch control line 510 can be provided in another pixel row—so a touch unit cell of this embodiment can be implemented as a 2×2 grouping of display pixels while maintaining the aperture ratio between pixel rows (by providing one additional conductive line, and only one additional conductive line, in each pixel row). (As noted the 2×2 display pixel grouping shown in FIG. 8 is, in this embodiment, the smallest pixel grouping that can provide a touch unit cell. However, larger pixel groupings than this smallest pixel grouping may be used to provide a touch unit cell. This is indicated in FIG. 8 by further conductive bridges that connect the VCOM electrode to the VCOM electrode of pixels in other rows or columns that are not shown in FIG. 8.)

In the two embodiments described so far, the drive/sense/NC/short functionality of the touch elements is selectable for each row of touch elements, independent of the functionality selected for other rows of touch elements, as a consequence of the way the control gates are arranged. But in some touch panel applications it may be desirable to have sensing touch elements in a direction perpendicular to a line of driving touch elements. This would require the ability to select functionality both in row—and column-wise fashion. FIG. 9A presents a modified version of the basic circuit of FIG. 5A which provides with such functionality by adding a transistor 900 and using a conductive line 910 to control it (transistor 901 and control line 911 for a second touch element 501 in its neighbourhood are also shown in the figure). In this circuit, switches 520 and 900 are connected in series between the common node 550 and the data line 541, but controlled by different control lines, 510 and 910 respectively. Switch 521 is connected between the common node 550 and the data line 540 as in FIG. 5A, and controlled by gate control line 511. The operation of the circuit is summarised in the table of FIG. 9B. Three combinations of the control lines result in node 550 being disconnected from the data lines; this means that the touch element is in the NC state described before. When switches 520 and 900 are closed and switch 521 is open, data line 541 is connected to node 550; this corresponds to the "sense" state for the touch element. When switch 521 is close and at least one of switches 520 and 900 is open, data line 540 is connected to node 550; this corresponds to the "drive" state for the touch element. When all three switches are close, both data lines 540 and 541 are connected to node 550, corresponding to the "short" state for the touch element. FIG. 9C shows examples of touch element patterns that are possible with the circuitry of FIG. 9A; "short" states are not shown in these examples.

In the touch element patterns of FIG. 9C, as for FIG. 5E, it is again the case that an entire row of touch elements must be put in the drive state (assuming that the control lines 510,511 control all touch elements of a row of touch elements). However, as can be seen in FIG. 9C, it is not necessary for all touch elements in a row to be put into the sense state and one row can contain touch elements in the sense state and touch elements in the NC state. This is possible though the provision of the additional switch 900, which is controlled by a control line 910 extending along the column direction so that switch 900 may be in different states for different touch elements of the same row.

In a variation of the circuit of FIG. 9A (shown in FIG. 9E), switch 900 is added in series with switch 521 instead of in series with switch 520, and examples of possible touch element patterns of this configuration are shown in FIG. 9D; "short" states have been omitted. In this embodiment an entire row of touch elements must be put in the sense state, but one row can contain touch elements in the drive state and touch elements in the NC state. The repositioned switch 900 is controlled by a control line extending in the column direction, so that elements in different columns of the same row can be in the drive state or the NC state.

The embodiment of FIG. 10 is one example of an implementation of FIG. 9A, based on a combination of the first and second embodiments. (As with FIG. 6, FIG. 10 is a partial plan view of a touch panel, showing only one touch unit cell.) FIG. 10 shows a touch unit cell that is formed of a 3×2 matrix of pixels. In addition to the switches required to provide the display functionality (that is, one per colour sub-pixel), the touch unit cell has further three switches (in this embodiment each formed of a single transistor) to provide the sense and drive functionality. In this embodiment switch 900 is optionally placed in the same column of (sub-) pixels as switch 520, as this allows electronic switches 520 and 900 to be connected by means of an internal vertical conductive line 1000, although in principle this is not necessary. Conductive lines 800 and 1001 are added for structural symmetry. In this particular example, the green display data line of the left column (608A) fulfils the role of data line 540, and the red display data line of the right column (607B) fulfils the role of data line 541. VCOM electrode 602 is, as before, electrically connected to node 550.

So far, embodiments with a three rows by two columns pattern have been described, but there is no need to be limited by such a pattern. For example, FIG. 11 introduces a further embodiment, in which a touch unit cell contains four rows and two columns of pixels. (As with FIG. 6, FIG. 11 is a partial plan view of a touch panel, showing only one touch unit cell.) In addition to the switches required to provide the display functionality (that is, one per colour sub-pixel), this embodiment uses three electronic switches (in this embodiment each formed of a single transistor) to provide the sense and drive functionality. In this embodiment, the functionality of a touch element may be selected independently of the functionality of other touch element— that is, it allows sense/drive function selection by both row and column. Also, as it does not use any of the colour data lines of the display to implement the touch functionality, this embodiment permits concurrent operation of touch panel and display. The circuital structure is the same as that of FIG. 9A, with switches 520 and 900 in series connecting node 550 (and VCOM 602) to data line 541, and with switch 521 connecting node 550 (and VCOM 602) to data line 540. The reader may notice that in this embodiment data lines 540 and 541 have opposite orientations than in FIG. 9. This is a consequence of FIG. 9A being just a schematic representation of the circuit, but not a depiction of any particular embodiment. A portion of a vertical conductive line, labelled 1100, is used to connect switch 520 and data line 541. The operation of this embodiment is also summarised by FIG. 9B.

Those skilled in the art would understand that other pixel patterns and switches arrangements are possible that provide the same or similar functionality as the embodiments described in this disclosure.

The invention claimed is:

1. An integrated touchscreen operable in either one of a self-capacitance touch sensing mode and a mutual-capacitance touch sensing mode and comprising a plurality of display pixels arranged in a two-dimensional matrix of rows and columns, each pixel row having an associated display control line and each pixel column having an associated display data line, each pixel including a pixel electrode, a common electrode and a display control switch for selectively connecting the pixel electrode to the display data line associated with the pixel, the display control switch having a control terminal connected to the display control line associated with the pixel;

wherein a matrix of touch elements is defined in the display pixels, a touch element encompassing an n×m group of touch unit cells, each unit cell composed of an k×j group of display pixels where k denotes the number of rows of pixels and j denotes the number of columns of pixels;

wherein the common electrodes of the display pixels encompassed in the touch unit cell are electrically connected together to form a common electrode for the touch unit cell;

wherein the common electrodes of the unit cells encompassed in the touch element form a common electrode for the touch element;

wherein the touch unit cell includes a conductive lines extending in the row direction and b conductive lines extending in the column direction, where a≤k and b≤j and at least one of a and b is non-zero;

wherein each of the (a+b) conductive lines of a unit cell encompassed by a touch element is connected to the respective conductive line of other units cells encompassed by the touch element;

wherein a touch unit cell includes two switching arrangements, one for selectively connecting the common electrode of the touch unit cell to a first touch data line and the other for selectively connecting the common electrode of the touch unit cell to a second touch data line;

and wherein the touchscreen comprises a controller adapted to operate in either one of a self-capacitance touch sensing mode in which, for at least one touch element, the controller applies an excitation voltage to the common electrode of the touch element and senses a signal generated by the touch element and a mutual-capacitance touch sensing mode in which the controller applies an excitation voltage to the common electrode of at least one touch element and determines a signal generated in at least another touch element of the matrix of touch elements.

2. A touchscreen as claimed in claim 1 wherein
the one switching arrangement comprises a first touch control switch connected between the first touch data line and the common electrode of the touch unit cell, and having a control terminal connected to a first touch sensing control line; and
the other switching arrangement comprises a second touch control switch connected between the second touch data line and the common electrode of the touch unit cell, and having a control terminal connected to a second touch sensing control line.

3. A touchscreen as claimed in claim 2 where the first touch control switch is disposed in a first display pixel of the display pixels encompassed in the touch unit cell and the second touch control switch is disposed in a second display pixel of the display pixels encompassed in the touch unit cell, the second display pixel being different to the first display pixel.

4. A touchscreen as claimed in claim 3 wherein the first display pixel and the second display pixel are in different rows of display pixels and different columns of display pixels.

5. A touchscreen as claimed in claim 3 wherein the first touch data line is distinct from the display data line connectable to the pixel electrode of the first pixel and the second touch data line is distinct from the display data line connectable to the pixel electrode of the second pixel.

6. A touchscreen as claimed in claim 2 wherein the one switching arrangement further comprises a third touch control switch connected in series with the first touch control switch between the first touch data line and the common electrode of the touch unit cell, and having a control terminal connected to a third touch sensing control line.

7. A touchscreen as claimed in claim 6 wherein the third touch control switch is disposed in a third display pixel of the display pixels encompassed in the touch element, the third display pixel being different to the first display pixel and to the second display pixel.

8. A touchscreen as claimed in claim 2, wherein the first and second touch sensing control lines are distinct from one another and from the display control lines.

9. A touchscreen as claimed in claim 2 wherein the other switching arrangement further comprises a third touch control switch connected in series with the second touch control switch between the second touch data line and the common electrode of the touch unit cell, and having a control terminal connected to a third touch sensing control line.

10. A touchscreen as claimed in claim 1 wherein the first touch data line and the second touch data line are distinct from the display data lines.

11. A touchscreen as claimed in claim 10, wherein the controller is operable, while supplying an excitation voltage to at least one of the touch elements, to simultaneously write display data to one or more display pixels in rows of display pixels different from the rows of display pixels not encompassed in the at least one touch element.

12. A touchscreen as claimed in claim 1 wherein, in a touch unit cell, the a conductive lines extending in the row direction are disposed in different rows of display pixels encompassed in the touch unit cell.

13. A touchscreen as claimed in claim 1 wherein, in a touch unit cell, the b conductive lines extending in the column direction are disposed in different columns of display pixels encompassed in the touch unit cell.

14. A touchscreen as claimed in claim 1 wherein, in the self-capacitance touch sensing mode, the controller, in use, applies the excitation voltage to the common electrode of the touch element via either the first touch data line or the second touch data line.

15. A touchscreen as claimed in claim 1 wherein, in the mutual-capacitance touch sensing mode, the controller, in use, applies the excitation voltage to the common electrode of the at least one touch element via either the first touch data line or the second touch data line.

16. A touchscreen as claimed in claim 1 wherein the controller is further operable to, for at least one touch element, isolate the common electrode of the touch element from both the first touch data line and the second touch data line.

17. A touchscreen as claimed in claim 1 wherein the controller is further operable to, for at least one touch element, simultaneously connect the common electrode of the touch element to both the first touch data line and the second touch data line.

18. A touch screen as claimed in claim 1 wherein one of the first touch data line and the second touch data line extends in the row direction and is provided in a row of display pixels.

19. A touchscreen as claimed in claim 1 wherein any two of the display data lines constitute the first touch data line and the second touch data line respectively.

20. A touch screen as claimed in claim 1 wherein $k \geq 2$ or $k \geq 3$.

* * * * *